US011576117B1

(12) United States Patent
Sevindik

(10) Patent No.: US 11,576,117 B1
(45) Date of Patent: Feb. 7, 2023

(54) METHODS AND APPARATUS FOR CABLE NETWORK POWER MANAGEMENT

(71) Applicant: Charter Communications Operating, LLC, St. Louis, MO (US)

(72) Inventor: Volkan Sevindik, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 17/383,823

(22) Filed: Jul. 23, 2021

(51) Int. Cl.
*H04L 49/90* (2022.01)
*H04W 52/02* (2009.01)

(52) U.S. Cl.
CPC ......... *H04W 52/0203* (2013.01); *H04L 49/90* (2013.01)

(58) Field of Classification Search
None
See application file for complete search history.

(56) References Cited

U.S. PATENT DOCUMENTS

2008/0137661 A1\* 6/2008 Kwon ............... H04L 47/34 370/394
2009/0016218 A1\* 1/2009 Hong ............... H04N 21/2402 370/231
2019/0058999 A1\* 2/2019 Gunasekara ......... H04W 16/14
2019/0115950 A1\* 4/2019 Kakinada ............. H04B 1/7136
2020/0053545 A1\* 2/2020 Wong .................. H04W 8/08
2020/0413325 A1\* 12/2020 Meredith ............. H04W 48/16

FOREIGN PATENT DOCUMENTS

EP 4007423 A1 \* 6/2022 ......... H04L 12/2801

\* cited by examiner

*Primary Examiner* — Ajit Patel
(74) *Attorney, Agent, or Firm* — Straub & Straub; Stephen T. Straub; Michael P. Straub

(57) ABSTRACT

The presentation invention relates to methods and apparatus for managing cable network power consumption. An exemplary method in accordance with one embodiment includes the steps of: receiving, by a cable modem positioned between a cable modem termination system (CMTS) and a wireless base station, CMTS buffer information; receiving, by the cable modem, wireless base station buffer information; switching, by the cable modem, from a first mode of operation to a second mode of operation after performing one or both of: (i) transmitting uplink data to the CMTS, and (ii) transmitting downlink data to the wireless base station, the second mode of operation being a power savings modem of operation; remaining in the power savings mode of operation for a first time period, the first time period being based on at least one of said CMTS buffer information or said wireless base station buffer information.

20 Claims, 18 Drawing Sheets

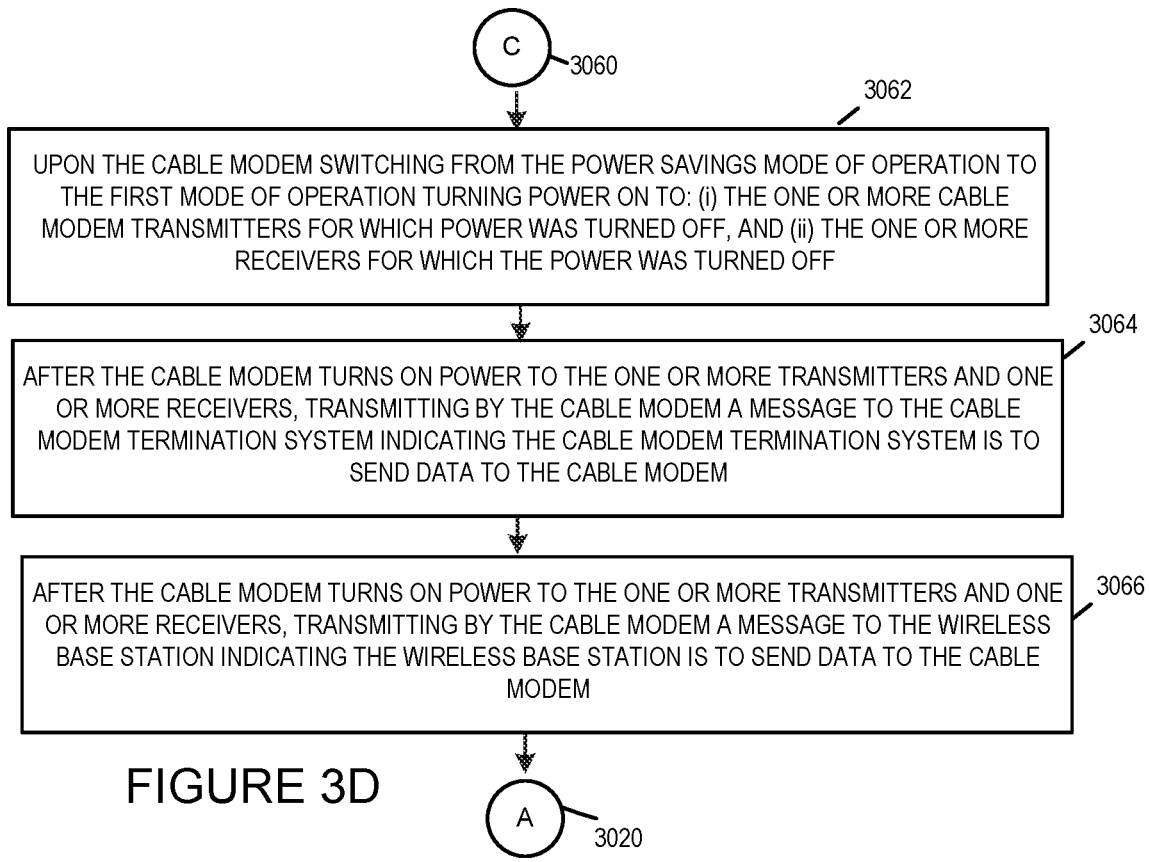

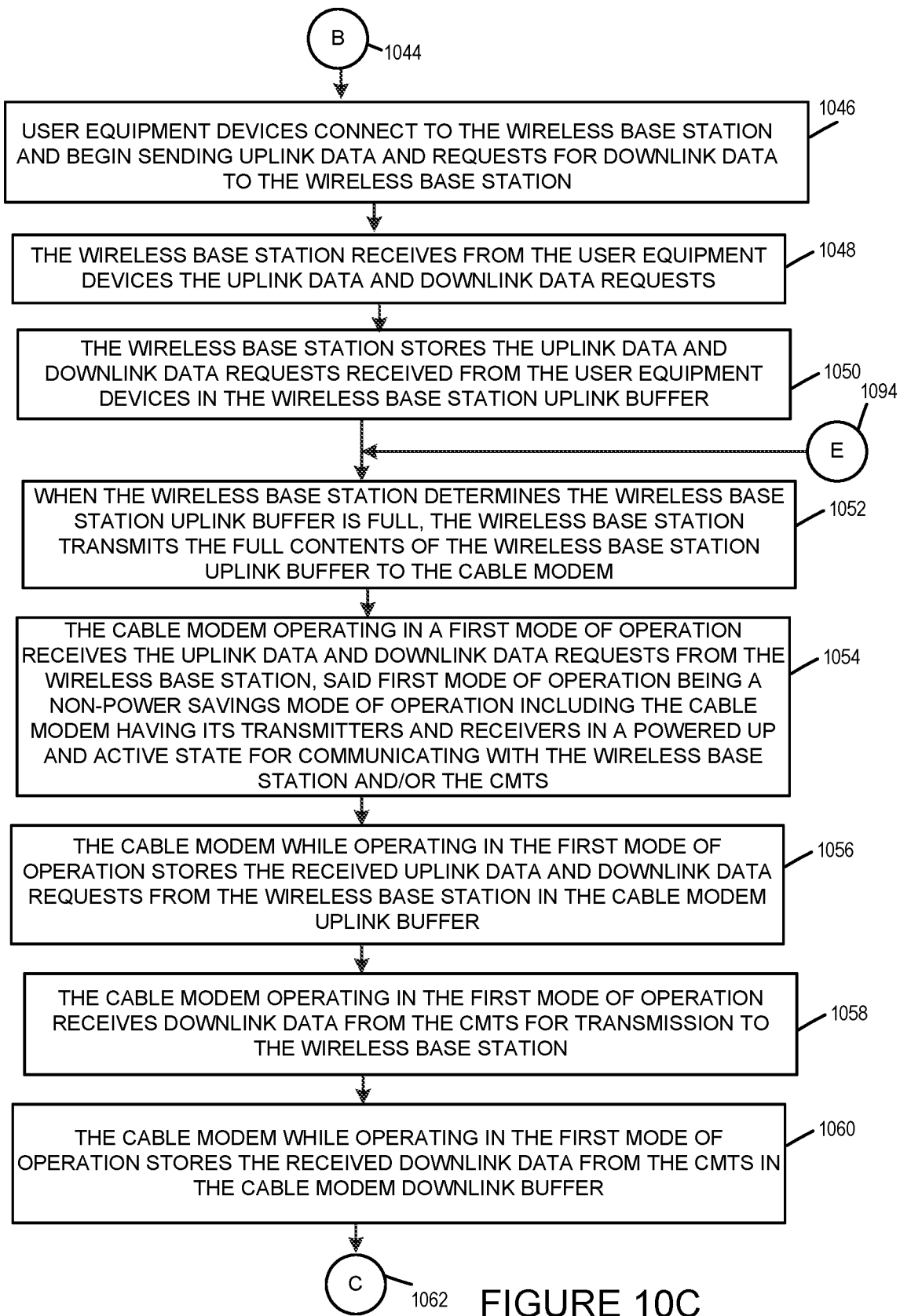

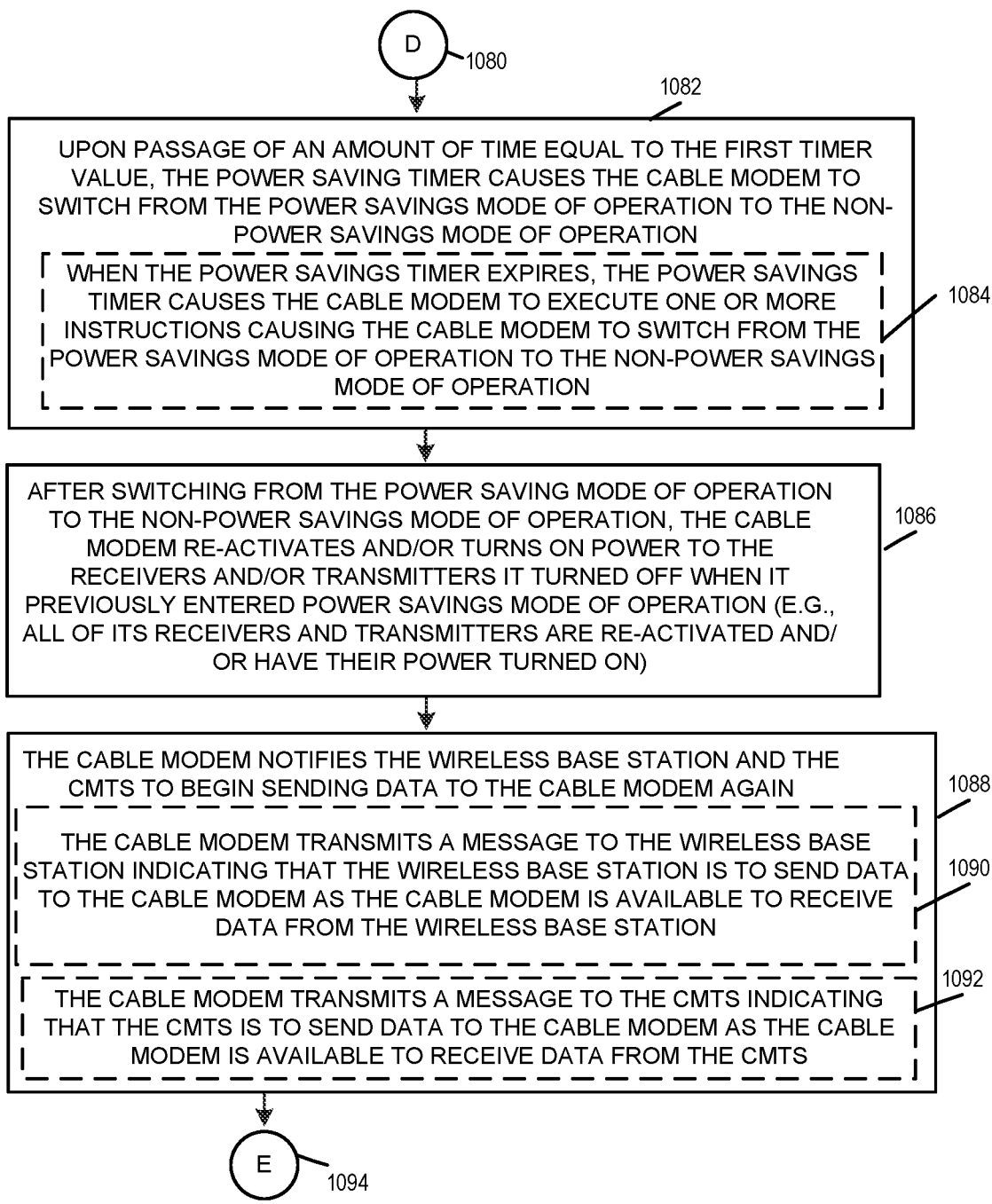

METHODS AND APPARATUS FOR CABLE NETWORK POWER MANAGEMENT

FIELD OF INVENTION

The present invention relates to methods and apparatus for power management in cable networks. The present invention is also directed to implementing power saving methods and apparatus in cable systems, e.g., Data Over Cable Service Interface Specification (DOCSIS) networks. Various features of the present invention relate to methods and apparatus for efficiently utilizing power in cable modems. The present invention is also related to saving and/or conserving power in cable modems of cable systems wherein the cable modems are connected to and, in some instances are, powering wireless base stations. The present invention is also related to methods and apparatus for storing and/or buffering data in cable modems in efficient manner allowing for the conservation of power utilization by the cable modems.

BACKGROUND OF THE INVENTION

Power consumption in cable networks, such as for example DOCSIS networks, is very crucial for network design and operation since if there is no power available in a certain region, the service provider can not operate the cable network in that region. Also, if the service provider has limited power plant capability in a particular region, then the service provider cannot operate too many cable modems in that region when the service provider is supplying the power to operate the cable modem. Thus, the management and distribution of available power among cable modems in cable networks is one of the technological problems and issues that service providers face. With the introduction of new 5G networks and 5G wireless networks, e.g., 5G CBRS networks, power consumption has increased. Upgrading power plants to handle increased loads is extremely expensive. Furthermore, the service providers are constantly looking for ways to more efficiently and effectively manage and utilize power in their networks to save costs associated with the expenditure of energy.

From the above it should be understood that there is a need for new and/or improved methods and apparatus for managing power effectively and efficiently in cable networks. Furthermore, there is a need for a technology solution to how to manage and distribute power so as to be able to increase the power consumption of the network without upgrading the power plant supply the cable networks power in a region that has limited power availability. There is a further need for new and/or improved methods and apparatus for minimizing power consumption by cable modems. There is a further need for new and/or improved methods and apparatus for operating cable modems in a more effective and efficient manner so that the cable modems utilize power for essential tasks and minimize or eliminate the use of power for other non-essential tasks. There is an additional need for new and/or improved methods and apparatus to more efficiently and effectively manage and utilize power in cable networks to save costs associated with the expenditure of energy. There is a further need for new and improved methods and apparatus to conserve power in cable systems. There is a further need for new and/or improved methods and apparatus for increasing power efficiency in legacy cable modem devices and cable systems.

SUMMARY OF THE INVENTION

Some service providers which operate both wireless and wired networks use a strand based deployment model for at least a portion of their wireless base stations. In the strand based deployment model, the service provider places or connects one or more of its wireless base stations, e.g., Citizen Broadband Radio Service Devices (CBSDs) in a Citizen Broadband Radio Service (CBRS) network, to the service provider's cable strand to provide services, e.g., 5G services, to its subscribers. Each of the wireless base stations, e.g., CBSDs, is connected to a separate cable modem (CM) and each of the separate cable modems is in turn connected to a cable modem termination system (CMTS). The cable modem termination system is a server residing in the service provider's data center. The cable modem termination system is connected to the service provider's core network, e.g., a SC core network. The cable modem termination system receives data from core network elements and/or devices and will schedule and send this data to the wireless base stations, e.g., CBSDs, via the cable modems to which the CBSDs are connected. The cable modem termination system has a buffer for each cable modem which is attached to it. The cable modem termination system does not have any information about the wireless base stations, e.g., CBSDs, or other users that are connected to the CBSD.

As discussed above, power consumption in cable networks, such as for example DOCSIS networks, is very crucial for network design and operation since if there is no power available in a certain region, the service provider can not operate the cable network in that region. Also, if the service provider has limited power plant capability in a particular region, then the service provider cannot operate too many cable modems in that region. Thus, the management and distribution of available power among cable modems in cable networks is one of the technological problems and issues that service providers face. With the introduction of new 5G networks and 5G wireless networks, e, 5G CBRS networks, power consumption has increased. Upgrading power plants to handle increased loads is extremely expensive. Furthermore, the service providers are constantly looking for ways to more efficiently and effectively manage and utilize power in their networks to save costs associated with the expenditure of energy.

The present invention provides new and/or improved methods and apparatus for power management in cable networks. The present invention is also directed to implementing new and/or improved power savings and/or conservation methods and apparatus in cable systems, e.g., Data Over Cable Service Interface Specification (DOCSIS) networks. Various features of the present invention relate to methods and apparatus for efficiently managing and utilizing power in cable modems. The present invention is also related to saving and/or conserving power in cable modems of cable systems wherein the cable modems are connected to and, in some instances are, powering wireless base stations. The present invention is also directed to new and/or improved methods and apparatus for managing, storing and/or buffering data in cable modems in efficient manner allowing for the conservation of power utilization by the cable modems. Various embodiments of the present invention solve one or more of the problems discussed above.

In explaining the various features of the invention they will sometimes be discussed in the context of examples where the wireless base stations are CBSD devices in a CBRS network connected to a cable modem which is connected to a core network. However, such examples are to facilitate understanding of the invention and it should be appreciated that the methods and apparatus are not limited to CBRS embodiments, wireless base stations which are CBSDs.

An exemplary communications method in accordance with an embodiment of the present invention includes the steps of: receiving, by a cable modem positioned between a cable modem termination system and a wireless base station, cable modem termination system buffer information; receiving, by the cable modem, wireless base station buffer information; switching, by the cable modem, from a first mode of operation to a second mode of operation after performing one or both of: (i) transmitting uplink data to the cable modem termination system, and (ii) transmitting downlink data to the wireless base station, said second mode of operation being a power savings modem of operation; and remaining in said power savings mode of operation for a first time period, said first time period being based on at least one of said cable modem termination system buffer information or said wireless base station buffer information. In some embodiments, the wireless base station is part of a wireless network operated by a first service provider. In some embodiments, the cable modem is part of a cable network operated by the first service provider. In some embodiments, the cable modem termination system is part of the cable network operated by the first service provider. In various embodiments, the wireless base station is a Citizens Broadband Service Device (CBSD) and the wireless network is a Citizens Broadband Radio Service (CBRS) network.

In various embodiments, the cable modem is powered by the cable modem termination system. In many embodiments, the wireless base station is powered by the cable modem termination system via the cable modem.

In some embodiments, the method further includes the step of: receiving power by the cable modem from the cable modem termination system over a first cable connecting the cable modem termination system and the cable modem, said first cable also being used for communicating messages between the cable modem termination system and the cable modem.

In some embodiments, the method further includes the step of: providing power by the cable modem to the wireless base station over a second cable connecting the cable modem to the wireless base station, said second cable also being used for communicating messages between the cable modem and the wireless base station.

In various embodiments, the power is provided by the cable modem termination system to the cable modem using Power over Ethernet. In some embodiments, the power is provided by the cable modem to the wireless base station using power over Ethernet.

In some embodiments, the cable modem termination system buffer information includes a first downlink buffer size value expressed as an amount of time (e.g., an amount of time it takes for the cable modem termination system downlink buffer for the cable modem to fill up to its capacity); and the wireless base station buffer information includes a first uplink buffer size value expressed as an amount of time (e.g., an amount of time it takes for the wireless base station uplink buffer to fill up to its capacity).

In some embodiments, the method further includes the steps of: receiving, by the cable modem, while said cable modem is in said first mode of operation downlink data from the cable modem termination system; storing the received downlink data at the cable modem in a cable modem downlink buffer; receiving, by the cable modem, while said cable mode is in said first mode of operation uplink data from the wireless base station; storing the received uplink data at the cable modem in a cable modem uplink buffer; and waiting until at least one of the following occurs: (i) the amount of data in the cable modem uplink buffer reaches a first threshold value, or (ii) the amount of data in the cable modem downlink buffer reaches a second threshold value, before transmitting either the stored downlink data or the stored uplink data.

In some embodiments, the first threshold value is an amount wherein 100% of all buffer entries in the cable modem uplink buffer are occupied (i.e., the buffer is full). In some other embodiments, the first threshold value is an amount less than 100% of all buffer entries in the cable modem uplink buffer being occupied.

In some embodiments, the second threshold value is an amount wherein 100% of all buffer entries in the cable modem downlink buffer are occupied (i.e., the buffer is full). In some embodiments, the second threshold value is an amount less than 100% of all buffer entries in the cable modem uplink buffer being occupied (e.g., the buffer is full and receipt of additional data will cause it to overflow). necessary).

In some embodiments, the method further includes that upon switching to said power savings mode of operation, turning off power by said cable modem to one or more cable modem transmitters included in said cable modem and turning off power by said cable modem to one or more cable modem receivers included in said cable modem.

In various embodiments, the switching, by the cable modem, from the first mode of operation to the second mode of operation occurs after performing both of: (i) transmitting uplink data to the cable modem termination system, and (ii) transmitting downlink data to the wireless base station, said second mode of operation being a power savings modem of operation.

In most embodiments, the turning off power by said cable modem to one or more cable modem transmitters included in said cable modem includes turning off power to all transmitters included in said cable modem; and the turning off power by said cable modem to one or more cable modem receivers included in said cable modem includes turning off power to all receivers included in said cable modem. In some embodiments wherein the cable modem uses a transceiver the cable modem turns off power to the transceiver.

In various embodiments, the method further includes that prior to turning off said one or more cable modem transmitters, (i) transmitting by the cable modem a first message to the wireless base station indicating that data is not to be sent by the wireless base station to the cable modem; and (ii) transmitting a second message to the cable modem termination system indicating that data is not to be sent by the cable modem termination system to the cable modem.

The method in various embodiments further includes that after the cable modem has remained in the power savings mode of operation for the first time period, switching by the cable modem from the power savings mode of operation back to the first mode of operation.

In some embodiments, the method further includes the step of: setting, by the cable modem, a power saving timer to expire after a first time value equal to said first time period prior to or upon entering said power saving mode of operation. The expiration of said power saving timer in various embodiments causes the cable modem to switch from said power saving mode of operation to the first mode of operation.

In some embodiments, upon switching from power savings mode of operation to said first mode of operation, the method further includes: turning power on to: (i) the one or more cable modem transmitters for which power was turned off, and (ii) the one or more cable mode receivers for which the power was turned off.

In some embodiments, after turning on power to the one or more transmitters and one or more receivers, the method includes transmitting a message to the cable modem termination system indicating the cable modem termination system is to send data to the cable modem and also transmitting a message to the wireless base station indicating the wireless base station is to send data to the cable modem.

In some embodiments, the method further includes the step of: determining, by the cable modem, the first time period based on at least one of the wireless base station buffer information or the cable modem termination system buffer information. In some such embodiments, the step of determining, by the cable modem, the first time period based on at least one of the wireless base station buffer information or the cable modem termination system buffer information includes: determining, by the cable modem, the first time period to be less than the smaller of: (i) an amount of time for a wireless base station uplink buffer used for storing uplink data to be transmitted to the cable modem to fill up or reach its capacity or (ii) an amount of time for the cable modem termination system downlink buffer used for storing downlink data to be transmitted to the cable modem to fill up or reach its capacity.

The present invention is also applicable to apparatus and system embodiments wherein one or more devices implement the steps of the method embodiments. In some apparatus embodiments each of the cable modems, cable modem termination systems, wireless base stations, CBSDs, user equipment devices, mobile terminals, cable modem termination system power management devices, resource allocation management devices, SAS devices, and each of the other apparatus/devices/nodes of the system include one or more processors and/or hardware circuitry, input/output interfaces including receivers and transmitters, and a memory. The memory including instructions when executed by one or more of the processors control the apparatus/device of the system to operate to perform the steps and/or functions of various method embodiments of the invention.

The present invention is also applicable to and includes apparatus and systems such as for example, apparatus and systems that implement the steps and/or functions of the method embodiments. For example, a communication system in accordance with one embodiment of the present invention includes a cable modem including: a memory including uplink and downlink buffers, and a processor that controls the cable modem to perform the following operations: receiving cable modem termination system buffer information, said cable modem being positioned between a cable modem termination system and a wireless base station; receiving wireless base station buffer information; switching from a first mode of operation to a second mode of operation after performing one or both of: (i) transmitting uplink data to the cable modem termination system, and (ii) transmitting downlink data to the wireless base station, said second mode of operation being a power savings modem of operation; remaining in said power savings mode of operation for a first time period, said first time period being based on at least one of said cable modem termination system buffer information or said wireless base station buffer information.

The present invention is also directed to non-transitory computer readable medium embodiments. In an exemplary non-transitory computer readable medium, the non-transitory computer readable medium includes a first set of computer executable instructions which when executed by a processor of a cable modem cause the cable modem to perform the steps of: receiving cable modem termination system buffer information, said cable modem being positioned between a cable modem termination system and a wireless base station; receiving wireless base station buffer information; switching from a first mode of operation to a second mode of operation after performing one or both of: (i) transmitting uplink data to the cable modem termination system, and (ii) transmitting downlink data to the wireless base station, said second mode of operation being a power savings modem of operation; remaining in said power savings mode of operation for a first time period, said first time period being based on at least one of said cable modem termination system buffer information or said wireless base station buffer information.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 3 illustrates the combination of FIGS. 3A, 3B, 3C, and 3D.

FIG. 3D illustrates the steps of the fourth part of an exemplary method in accordance with one embodiment of the present invention.

FIG. 10 illustrates the combination of FIGS. 10A, 10B, 10C, 10D, and 10E.

FIG. 10C illustrates the steps of the third part of an exemplary method in accordance with one embodiment of the present

FIG. 10E illustrates the steps of the fifth part of an exemplary method in accordance with one embodiment of the present invention.

DETAILED DESCRIPTION

Figure 1:
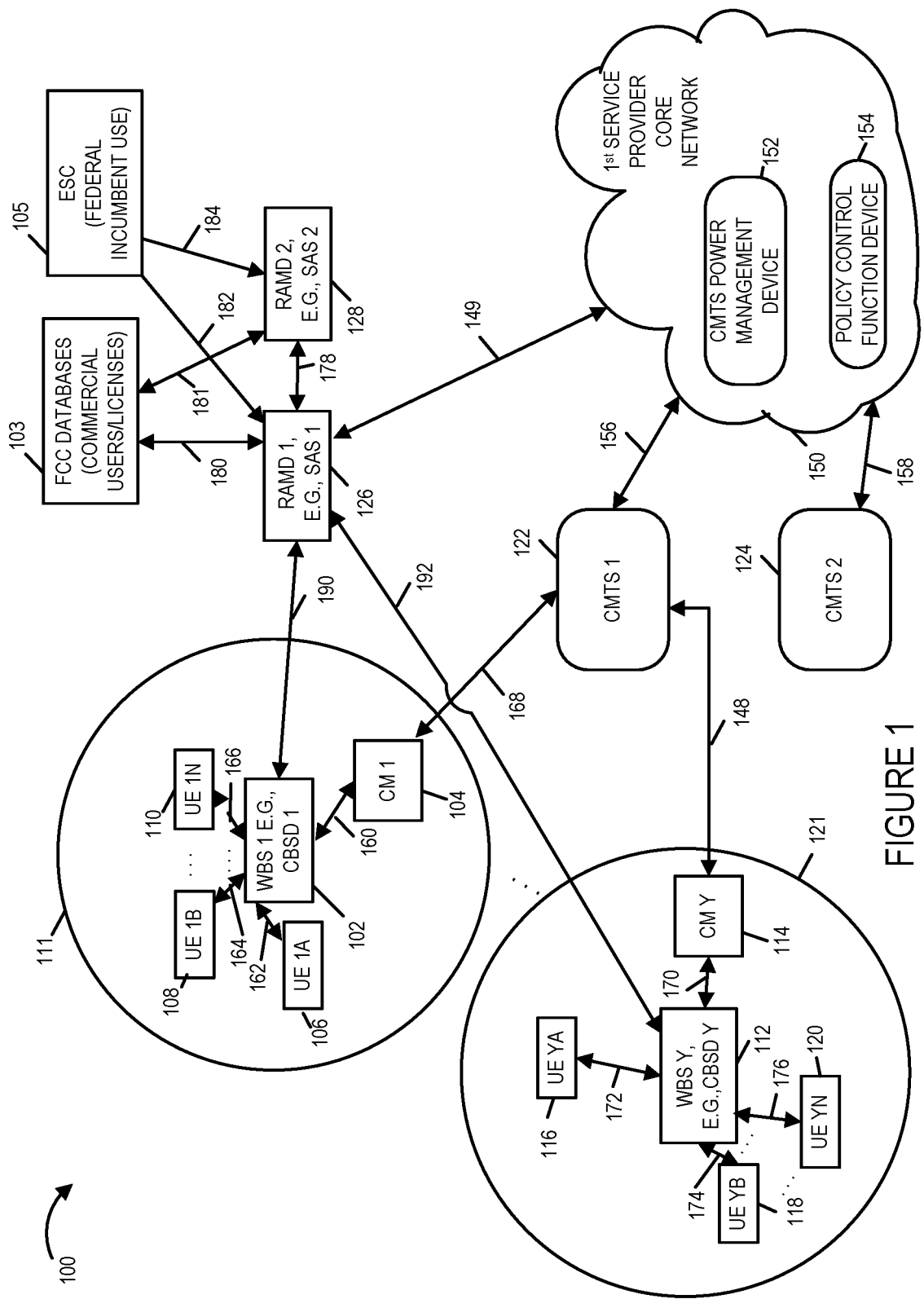
FIG. 1 illustrates an exemplary system in accordance with one embodiment of the present invention.

The current invention is applicable to cable systems which employ cable modem termination systems which power cable modems. The current invention is also applicable to service providers which operate both wireless and wired networks that use a strand based deployment model for at least a portion of their wireless base stations. In the strand based deployment model, the service provider places or connects one or more of its wireless base stations, e.g., Broadband Radio Service Devices (CBSDs) in a Citizen Broadband Radio Service (CBRS) network, to the service provider's cable strand to provide services, e.g., 5G services, to its subscribers. Each of the wireless base stations, e.g., CBSDs, is connected to a separate cable modem (CM) and each of the separate cable modems is in turn connected to a cable modem termination system (CMTS). The cable modem termination system is a server residing in the service provider's data center. The cable modem termination system is connected to the service provider's core network, e.g., a 5G core network. The cable modem termination system receives data from core network elements and/or devices and will schedule and send this data to the wireless base stations, e.g., CBSDs, via the cable modems to which the CBSDs are connected. The cable modem termination system has a buffer for each cable modem which is attached to it. The cable modem termination system does not have any information about the wireless base stations, e.g., CBSDs, or other users that are connected to the CBSD. The cable modem termination system provides power to the cable modern to which it is connected. The cable modern in turn provides power to the wireless base station, e.g., CBSD, which is connected to it.

The current invention is applicable to communications networks/systems such as for example, cable systems to which wireless base stations, e.g., CBSDs of Citizens Broadband Radio Service (CBRS) networks, gNBs of 5G networks, are connected via cable modems. The present invention relates to methods, systems and apparatus for power management in cable networks. Various features of the present invention relate to methods and apparatus for managing power distribution to cable modems and/or wireless base stations in cable networks. The present invention is also directed to implementing power saving methods and apparatus in cable systems, e.g., Data Over Cable Service Interface Specification (DOCSIS) networks. The present invention is also related to conserving and/or saving power in cable modems of cable systems.

For explanatory purposes various features of the current invention will be explained using CBRS wireless network. However, as also explained above a CBRS wireless network is merely an exemplary wireless network in which the invention may be implemented.

Citizens Broadband Radio Service networks are networks that include user equipment devices, e.g., mobile or wireless devices such as for example cell phones, smart phones, laptops, tablets, Citizens Broadband Radio Service Devices (CBSDs) which serve as access points/base stations, and Spectrum Access Systems which are resource allocation management devices that provide spectrum assignments and manage frequency interference through power management of the wireless base stations (CBSDs) transmission power. The Citizens Broadband Radio Service network utilizes 150 megahetz in the 3550-3700 MHz band referred to as the 3.5 GHz Band. One important aspect of the CBRS network is the limitation of interference, e.g., radio transmission, from multiple transmission sources, e.g., multiple CBSD devices located near each other or in close proximity to one another. The CBRS network includes resource allocation management devices referred to as Spectrum Access Systems that obtain information about registered or licensed commercial users in the 3.5 GHz band from FCC databases and information about federal incumbent users of the band from ESC (Environmental Sensing Capability) system and interact directly or indirectly with CBSDs operating in the band to ensure that Citizens Broadband Radio Service users operate in a manner consistent with their authorizations and promote efficient use of the spectrum resource. Among the Spectrum Access System functions as defined in the Amendment of the Commission's Rules with Regard to Commercial Operations in the 3550-3650 MHz Band released Apr. 21, 2015 are that: it determines the available frequencies at a given geographic location and assign them to CBSDs; it determines the maximum permissible transmission power level for CBSDs at a given location and communicates that information to the CBSDs; it registers and authenticates the identification information and location of CBSDs; it enforces exclusion and protection zones, including any future changes to such Zones, to ensure compatibility between Citizens Broadband Radio Service users and incumbent federal operations; it protects Priority Access Licensees (PAL) from impermissible interference from other Citizens Broadband Radio Service users such as the General Authorized Access users; ensures secure and reliable transmission of information between the SAS, ESC, and CBSDs; and it facilitates coordination and information exchange between SASs. Through the management of the CBSDs power transmission levels in a geographical area the SAS manages the radio interference in the geographical area.

FIG. 1 illustrates an exemplary communications system 100 having an architecture implemented in accordance with the present invention. This exemplary communications system includes a 5G Citizens Broadband Radio Service wireless network, a core network and a cable network which couples at least some of the wireless base stations of the CBRS network to the core network. In the exemplary embodiment, a first service provider or operator operates and/or owns the cable network, the CBRS wireless network and the core network. The communications system 100 includes a plurality of wireless base stations (WBS 1 (e.g., Citizens Broadband Radio Service Device (CBSD) 1 102, . . . , WBS Y (e.g., CBSD Y) 112, a resource allocation management device (RAMD 1)(e.g., Spectrum Access System device 1 (SAS 1) 126, a RAMD 2 (e.g., SAS 2) 128, databases of commercial users/licenses (e.g., an FCC Database) 103, an Environmental Sensing Capability (e.g., Federal Incumbent Use) (ESC) system 105, a plurality of user equipment (UE) devices UE 1A 106, UE 1B 108, . . . , UE 1N 110, UE YA 116, UE YB 118, . . . , UE YN 120, Cable Modem (CM) 1 104, . . . , Cable Modem Y 114, Cable Modem Termination System (CMTS) 1 122, Cable Modem Termination System 124, Cable Modem Management Device 152, Policy Control Function Device 154, communications links 148, 149, 156, 158, 160, 162, 164, ..., 166, 168, 170, 172, 174, ..., 176, 178, 181, 182, 184, 190, 192, a first cell 111 illustrating the first base station 102's coverage area, a second cell 121 illustrating the second base station 112's coverage area.

The first cell 111 of the network is serviced by the WBS 1 (e.g., CBSD 1) 102. The first cell 111 illustrates the wireless coverage range of WBS 1 (e.g., CBSD 1) 102 at a first time T1. The user equipment devices also sometimes referred to as user terminal devices UE 1A 106, UE 1B 108, ..., UE 1N 110 are located in the first cell 111 and are in active wireless communications with WBS 1 (e.g., CBSD 1) 102. Communications links 162, 164, and 166 illustrate wireless communications channels, e.g., radio channels, over which WBS 1 (e.g., CBSD 1) 102 and UE 1A 106, UE 1B 108, ..., UE 1N 110 communicate respectively.

The second cell 121 of the wireless network is serviced by WBS 2 (e.g., CBSD 2) 112. The second cell 121 illustrates the wireless coverage range of WBS 2 (e.g., CBSD 2) 112 at the first time T1. The user equipment devices UE YA 116, UE YB 118, ..., UE YN 120, (Y being an integer greater than 1) are located in the second cell 121 and are in communication with WBS 2 (e.g., CBSD 2) 112. Communications links 172, 174, ..., 176 illustrate wireless communications channels, e.g., radio channels, over which WBS 2 (e.g., CBSD 2) 112 and UE YA 116, UE YB 116, ..., UE YN 1260 communicate respectively.

Resource Allocation Management Device (RAMD) 1 (e.g., SAS 1) 126 is coupled to Resource Allocation Management Device (RAMD) 2 (e.g., SAS 2) 128 via communications link 178. RAMD 1 (e.g., SAS 1) 126 is coupled to databases 103 via communications link 180. RAMD 2 (e.g., SAS 2) 128 is coupled to databases 103 via communications link 181. ESC system 105 is coupled to RAMD 1 (e.g., SAS 1) 126 and RAMD 2 (e.g., SAS 2) 128 via communications links 182 and 184. The ESC system is used to detect, sense Navy radar operations in the wireless bands utilized for communications in the wireless network, e.g., in CBRS networks the ESC detects or senses Navy radar operation within 3550-3650 MHz near the coasts, and provide notifications over the communications links to RAMD 1 (e.g., SAS 1) 126 and RAMD 2 (e.g., SAS 2) 128. RAMD 1 (e.g., SAS 1) 126 manages the WBS 1 (e.g., CBSD 1) 102 and WBS 2 (e.g., CBSD 2) 112 spectrum allocation and transmission power to limit interference in the wireless network (e.g., CBRS wireless network). RAMD 2 (e.g., SAS 2) 128 manages other wireless base stations (e.g., CBSDs) in the wireless network which are not shown in FIG. 1. Resource Allocation Management Device 1 (e.g., SAS 1) 126 and Resource Allocation Management Device 2 (e.g., SAS 2) 128 communicate and share information regarding the wireless network coverage of the wireless base stations (e.g., CBSDs) each respectively manage and coordinate management of the allocation of spectrum and power transmission levels of wireless base stations (e.g., CBSDs) throughout the wireless network. While only two Resource Allocation Management Devices (e.g., SAS devices) are shown in FIG. 1 it should be understood that additional Resource Allocation Management Devices (e.g., SAS devices) are typically used in the wireless network (e.g., CBRS network). The WBS 1 102, and WBS Y 112 coupled and/or connected to the RAMD 1 126 via the 1st service provider core network 150. The RAMD 1 126 is coupled to the first service provider's core network 150 via communications link 149. The WBS 1 102 is coupled and/or connected to the RAMD 1 126 via communications link 190. WBSD 2 112 is coupled and/or connected to RAMS 1 128 via communications link 192.

WBS 1 102 is coupled and/or connected to cable modem 104 via communications link 160. The cable modem 1 104 is coupled and/or connected to the cable modem termination system 1 122 via communications link 168. The cable modem termination system 1 122 is coupled and/or connected to the first service provider core network 150 via communications link 156. The WBS 1 102 communicates with the devices in the first service provider core network 150 via cable modem 104 and CMTS 1 122.

WBS Y 112 is coupled and/or connected to cable modem CM Y 114 via communications link 170. Cable Modem Y 114 is coupled and/or connected to the cable modem termination system 1 122 via communications link 148. The cable modem termination system 1 122 is coupled and/or connected to the first service provider core network 150 via communications link 156. The WBS Y 112 communicates with the devices in the first service provider core network 150 via the cable modem Y 114 and CMTS 1 122.

WBS 1 102, WBS Y 112, CM 1 104, CM Y 114, CMTS 1 122 and CMTS 2 124 are owned and/or operated by the first service provider.

The nodes, devices and elements of the first service providers core network 150 are interconnected via a communications network including communications links which allow the various nodes, devices and elements of the first service providers core network 150 to communicate and exchange information and data.

The first service provider's core network 150 in this exemplary embodiment is a 5G network including a cable modem termination system power management device 152 and a policy control function device 154. The 5G network core typically also includes a session management function device or node, security gateway function device or node, an access and mobility management function (AMF) device and a user plane function (UPF) device. The cable modem termination system power management device 152 is connected and/or coupled to a power plant system that controls the management, supply and/or distribution of power for the cable modem system. The cable modem termination system power management device 152 instructs the CMTS devices in specific regions on whether it needs to reduce power. In some embodiments, the CMTS power management device 152 is not located in the core network of the first service provider but is instead coupled and/or connected to the core network of the first service provider.

CMTS 2 124 coupled to the core network via communications link 158. CMTS 1 and CMTS 2 may be, and in some embodiments are, included in a cable head end system of first service provider.

The cable modems 1 104 and cable modem Y 114 may be, and in some embodiments are DOCSIS compliant cable modems, e.g., DOCSIS 3.0, 3.1, 4.0 compliant cable modems.

The communications links 148, 149, 156, 158, 160, 168, 170, 178, 180, 181, 182, 183, 190, and 192 as well as the communications links coupling together the elements of the core network 150 are typically wired communications links or fiber optic cables. The communications links 162, 164, ..., 166, 172, 174, ..., 176 are wireless or over the air communications links. It is to be understood that the communication links shown in system 100 are only exemplary and other network configurations and communications links may be employed that couple together the devices, servers, nodes, entities, databases and controllers of the system. Elements or steps with the same reference numbers used in different figures are the same or similar and those elements or steps will not be described in detail again.

While for the sake of simplicity in explaining the invention system 100 only illustrates two active wireless base stations (e.g., CBSD devices), two cable modems, two CMTS devices, two Resource Allocation Management Devices (e.g., SAS devices) and a few UE devices, it will be appreciated that system 100 typically includes a large plurality of active wireless base stations (e.g., CBSDs) in the wireless network supporting a large plurality of UE devices with a large number of the plurality of active wireless base stations being coupled to the core network via a cable modem and CMTS. The cable system includes a large plurality of cable modem termination systems each coupled to a large plurality of cable modems which may be either connected to a single wireless base station, e.g., CBSD, or another device or devices. The CMTS devices are typically located in the service provider's cable head end and provide high speed data service connections.

The Cable Modem Termination System powers up the cable modems connected to it through the communications link which connects the cable modem termination system to the cable modem. The communications link for example may be, and in some embodiments is, an Ethernet cable. The Cable Modem Termination System also powers the wireless base station, e.g., CBSD, which is connected to the cable modem termination system via the cable modem. That is the Cable Modem Termination System first powers up the cable modem which in turn provides power to the wireless base station, e.g., CBSD. The power passing through the cable modem and communications link connecting the wireless base station and the cable modem. In some embodiments, the communications link coupling the cable modem to the wireless base station is an Ethernet cable.

The cable modems are located on the cable strands to provide the connection to the wireless base stations, e.g., a DOCSIS connection to CBSDs in a CBRS system.

The first service provider will also operate one or more power plants. Each power plant is the power house which provides power for all Cable Modem Termination Systems in the network. Power plants are local power resources that are responsible for the provisioning and distribution of power for all Cable Modem Termination Systems and Cable Modems (through the CMTSs) running in the local region for which the power plant is supplying power. Cables through which power is supplied run from the power plant to Cable Modem Termination Systems.

Figure 2:
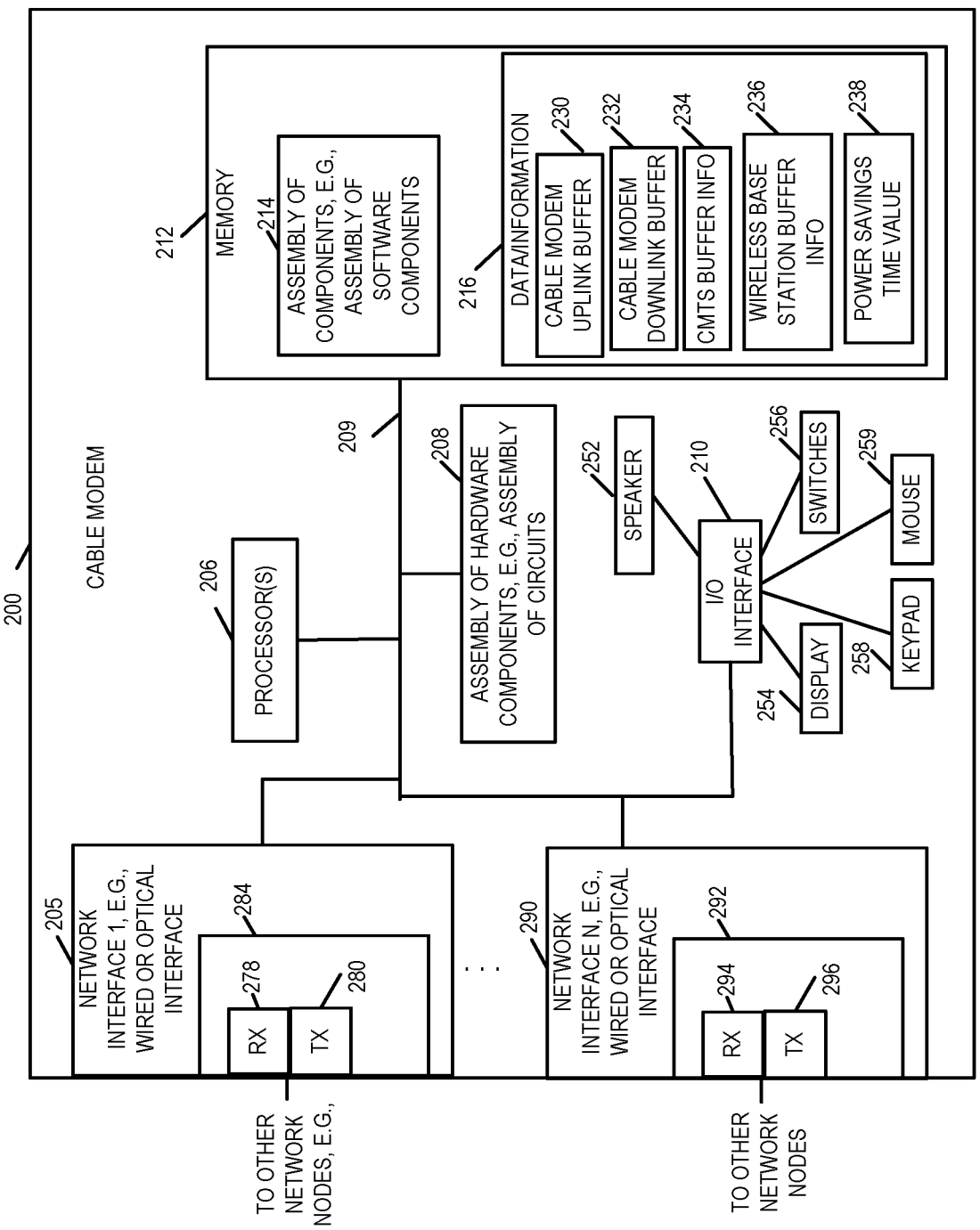
FIG. 2 illustrates details of an exemplary cable modem in accordance with one embodiment of the present invention.

FIG. 2 is a drawing of an exemplary cable modem such as a cable modem 1 104 of system 100. The cable modem 200 includes a plurality of network interfaces 1 205, . . . , network interface N 290, e.g., each being a wired or optical interface, a processor(s) 206 (e.g., one or more processors), e.g., a CPU, an assembly of hardware components 208, e.g., an assembly of circuits, and I/O interface 210 and memory 212 coupled together via a bus 209 over which the various elements may interchange data and information. The cable modem 200 further includes a speaker 252, a display 254, switches 256, keypad 258 and mouse 259 coupled to I/O interface 210, via which the various I/O devices (252, 254, 256, 258, 259) may communicate with other elements (206, 208, 212) of the cable modem 200. Network interface 205 includes a receiver 278 and a transmitter 280. Network interface 290 includes receiver 299 and transmitter 296. In some embodiments, network interfaces 205 and/or 290 includes multiple receivers and transmitters. The network interfaces 205 and 290 are used to communicate with other devices, e.g., wireless base station and/or cable modem termination system. In some embodiments, receiver 278 and transmitter 280 are part of a transceiver 284. In some embodiments, receiver 294 and transmitter 296 are part of a transceiver 292. Memory 212 includes an assembly of component 214, e.g., an assembly of software components, and data/information 216. Data/information 216 typically includes, among other things, cable modem uplink buffer 230, cable modem downlink buffer 232, cable modem termination system buffer information 234, wireless base station buffer information 236 and power savings time value 238. In some embodiments, the cable modems disclosed in the figures and/or discussed in connection with the various embodiments of the invention are implemented in accordance with cable modem 200. For example, cable modem 1 (e.g., CM 1 104), . . . , cable modem Y (CM Y 114) of FIG. 1 are implemented in accordance with cable modem 200.

The steps of an exemplary method in accordance with an embodiment of the present invention will now be discussed. A wireless base station (e.g., CBSD 1 102 of system 100) turns on and connects with a cable modem (e.g., CM 1 104 of system 100). The cable modem is connected to and powered by a cable modem termination system (e.g., CMTS 1 122 of system 100). The cable modem is positioned between the wireless base station and the cable modem termination system. The wireless base station connects to its service providers core network via the cable modem and cable modem termination system. The cable modem termination system being connected to the core network. The CBSD connects with a Spectrum Access System (e.g., SAS 1 126 of system 100). The Spectrum Access System grants spectrum to the CBSD for use in communicating with and providing services to user equipment devices (e.g., UE 1A 106, UE 1B 108, . . . , UE 1N 110 of system 100). The user equipment devices connect to the CBSD and begin requesting downlink data and also start sending data uplink. The cable modem creates a downlink data buffer for the traffic that will be sent to the CBSD and an uplink data buffer for the traffic that will be sent to the CMTS. The cable modem checks the cable modem buffer size in the created cable modem downlink buffer and the buffer size in the created cable modem uplink buffer and calculates the amount of power consumed to send data when the downlink buffer is fully occupied. The CM also calculates the amount of power consumed to send its data when the created cable modem uplink buffer is fully occupied.

The cable modem receives uplink data from the CBSD and downlink data from the cable modem termination system. Before sending packets, e.g., data packets, one by one over the communications links to the cable modem termination system and the CBSD, the cable modem waits for an opportunity to send data when its uplink and downlink buffers are both full are nearly full. For example, the cable modem will keep buffering traffic sent in the uplink by the CBSD and the cable modem will keep buffering traffic sent in the downlink by the cable modem termination system. The cable modem will not send any data to the CBSD in the downlink and will not send any data to the CMTS in the uplink till the cable modem downlink and cable modem uplink buffers are full, or nearly full. The cable modem will compare the amount of data in the downlink and uplink data buffers and if the buffers are full, the cable modem will send "Do not send data" message to CBSD and CMTS. When the CBSD receives this "Do not send data" message, the CBSD will keep buffering data in its own uplink data buffer and will not send additional data to the cable modem. Similarly, when the CMTS receives the "Do not send data" message, the CMTS will continue to buffer data in its own downlink data buffer and will not send additional data to the cable modem. The cable modem at this time will flush out, i.e., transmit, all the data in the downlink buffer towards the CBSD and the cable modem will flush out all of data in its uplink buffer towards the cable modem termination system. The cable modem will then turn itself off for a time duration of "T". For example, the cable modem will turn off power to various circuits on the cable modem including its transmitter(s) and receiver(s) for a time duration "T". The cable modem provides power to the CBSD. The cable modem even when it turns itself "off" will continue to provide power to the CBSD throughout the time period "T". The CBSD's power will be uninterrupted. After the time duration "T" has passed, the cable modem will turn itself on again powering up the various circuits it had turned off including its transmitters and receivers.

Once the transmitters and receivers have been powered up, the cable modem sends a "Send Data" message to both the CBSD and the cable modem termination system. Upon receiving this message, the CBSD will flush out all the uplink data in its own uplink data buffer to the cable modem and the cable modem termination system will also flush out the data it has in its downlink data buffer to the cable modem. The cable modem then repeats the process.

The amount of time "T" that the cable modem will power down for is determined by the cable modem based on buffer information provided by the cable modem termination system and the CBSD. The "T" depends on how large the uplink data buffer of the CBSD is in terms of time. If the CBSD can buffer or keep 200 msec worth of data in its uplink buffer, then the cable modem has to power up before this time is over so "T" needs to smaller than 200 msec. Similarly, if the cable modem termination system can buffer or keep 500 msec worth of data in its downlink buffer, the cable modem has to power up before this time is over. The cable modem will take into account both the CBSD uplink buffer time and the cable modem termination system downlink buffer time and will select a time "T" which is less than the lowest of the cable modem termination system downlink buffer time and the CBSD uplink buffer time. The cable modem receives this buffer information from the CBSD and the cable modem termination system, e.g., when a connection is established between the cable modem and each of these devices. The cable modem can use any kind of "Buffer Size Information" message sent from the CBSD to the cable modem and from the cable modem termination system to the cable modem to obtain this information. In some embodiments, the cable modem may send a request to the cable modem termination system and/or the CBSD to obtain the buffer information.

For example with respect to power savings, if the cable modem can turn itself off for approximately 200 msec 10 times in an hour, that is approximately, 5 hours of power savings per year. If that is multiplied by 10,000 cable modems, then the service provider will have 6 years worth of electricity savings in one year of operation.

Figure 3A:
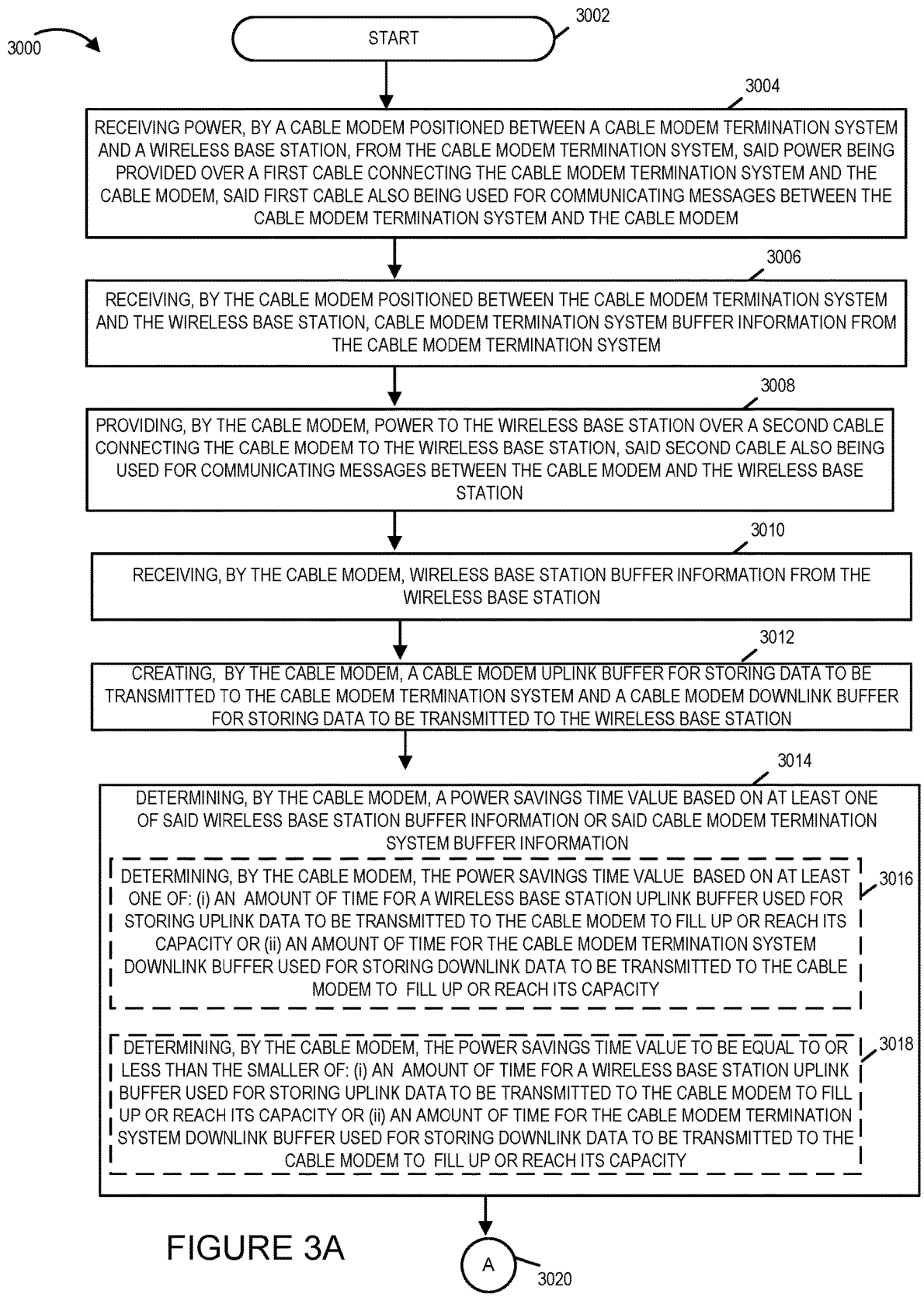
FIG. 3A illustrates the steps of the first part of an exemplary method in accordance with one embodiment of the present invention.
Figure 3B:
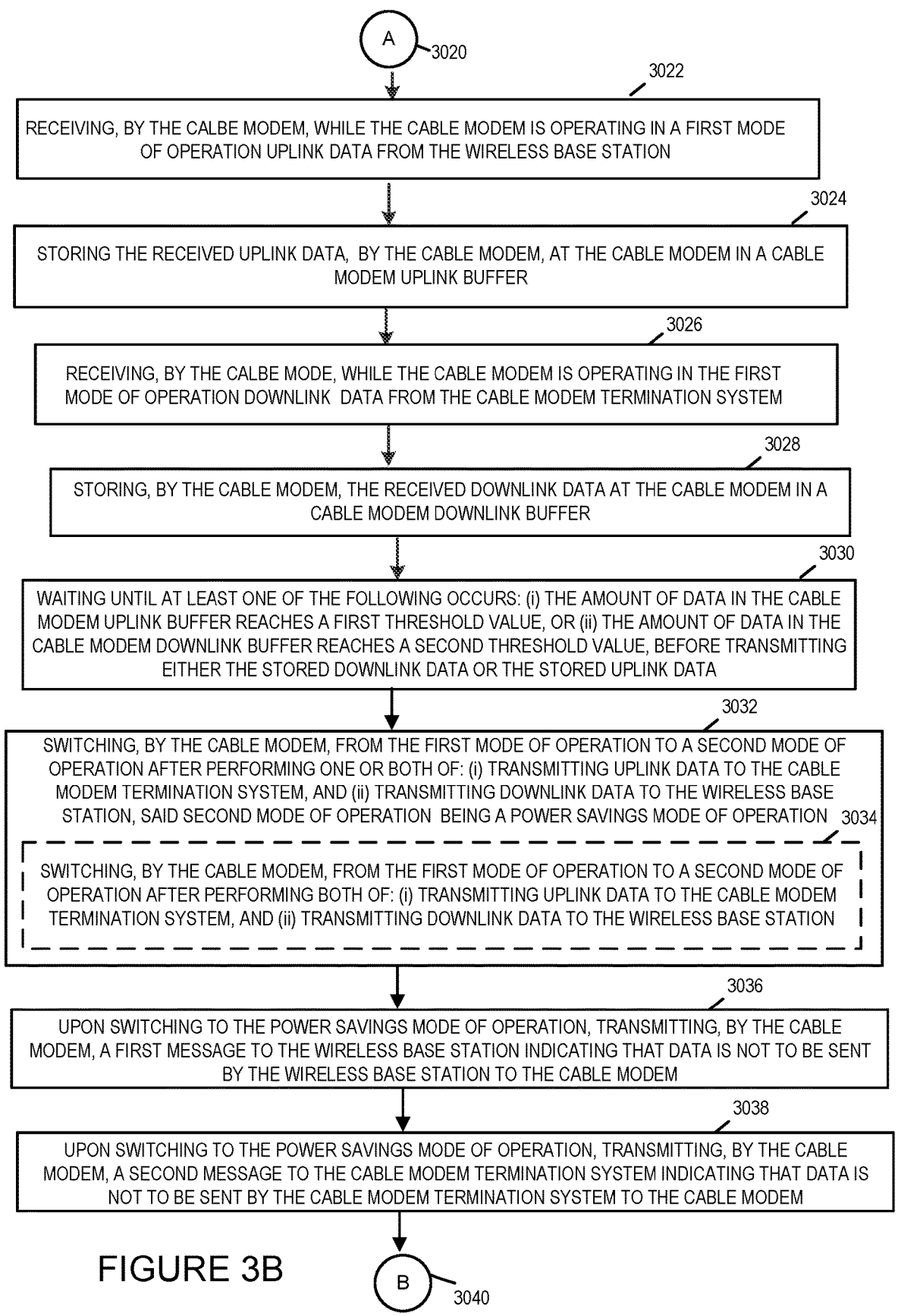
FIG. 3B illustrates the steps of the second part of an exemplary method in accordance with one embodiment of the present invention.
Figure 3C:
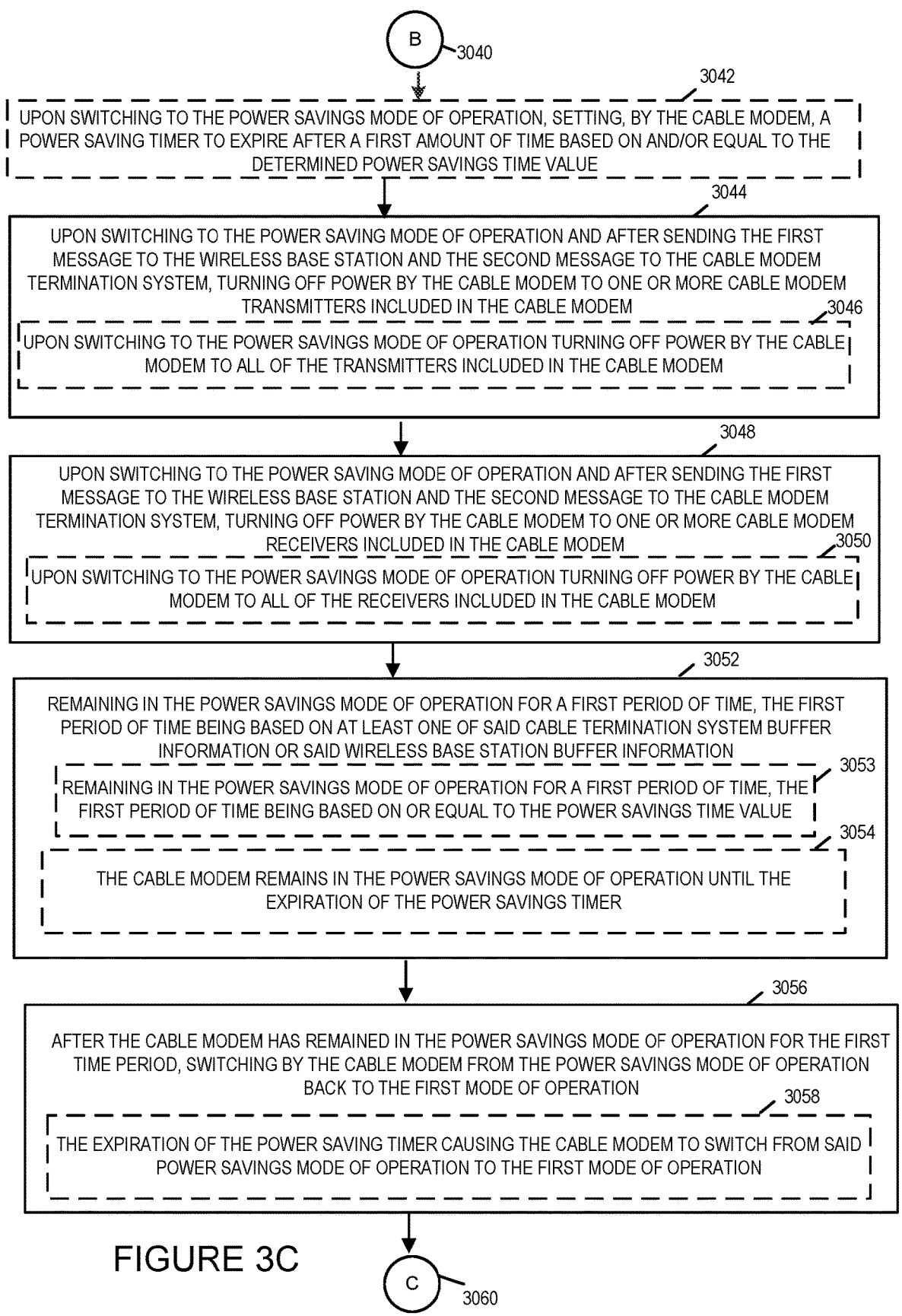
FIG. 3C illustrates the steps of the third part of an exemplary method in accordance with one embodiment of the present

FIG. 3, which comprises the combination of FIGS. 3A, 3B, 3C and 3D illustrates an exemplary method 3000. FIG. 3A illustrates the steps of the first part of an exemplary method 3000 in accordance with one embodiment of the present invention. FIG. 3B illustrates the steps of the second part of an exemplary method 3000 in accordance with one embodiment of the present invention. FIG. 3C illustrates the steps of the third part of an exemplary method 3000 in accordance with one embodiment of the present invention. FIG. 3D illustrates the steps of the fourth part of an exemplary method 3000 in accordance with one embodiment of the present invention.

For explanatory purposes the exemplary method 3000 will be explained in connection with the exemplary wireless network system 100 illustrated in FIG. 1 wherein the wireless network is a CBRS network, wireless base stations are CBSD devices, and the resource allocation management devices are SAS devices. However, it should be understood that the method may be implemented using other systems (e.g., 5G systems, 4G systems, LTE systems) and other system configurations then those illustrated in FIG. 1. While it will be readily understood that additional steps and signaling are performed in connection with communicating information, messages, and packets between devices, the method 3000 focuses on and discusses the steps and signaling for understanding the invention.

The method 3000 starts in start step 3002 shown on FIG. 3A. Operation proceeds from start step 3002 to step 3004.

In step 3004, a cable modem, e.g., cable modem 1 104 of system 100, positioned between a cable modem termination system, e.g., CMTS 1 122, and a wireless base station, e.g., WBS 1 102 of system, receives power from the cable modem termination system. The power is provided in this example via a first cable connecting the cable modem termination system and the cable modem. This first cable in this example is also used for communicating messages, e.g., message including data packets and/or control messages, between the cable modem termination system and the cable modem. In some embodiments, the power is provided using Power over Ethernet. Operation proceeds from step 3004 to step 3006.

In step 3006, the cable modem which is positioned the cable modem termination system and the wireless base station receives cable modem termination system buffer information from the cable modem termination system, e.g., the amount of time it takes for the cable modem termination system downlink buffer used to store downlink messages for the cable modem to fill up to its capacity. In some embodiments, the cable modem termination system buffer information includes the sizes of its downlink and uplink buffers used for storing data to be sent to the cable modem and for storing data received from the cable modem respectively. In some embodiments, the cable modem termination system buffer information also includes the buffer fill rates for the cable modem termination system uplink buffer and downlink buffer. Operation proceeds from step 3006 to step 3008.

In step 3008, the cable modem provides power to the wireless base station over a second cable. The second cable connects the cable modem to the wireless base station. In this example, the second cable is also used to communicating messages, e.g., messages including data packets and/or control messages, between the cable modem and the wireless base station. In some embodiments, the power is provided using Power over Ethernet. Operation proceeds from step 3008 to step 3010.

In step 3010, the cable modem receives wireless base station buffer information from the wireless base station e.g., the amount of time it takes for the wireless base station buffer used to store uplink messages for the cable modem to fill up to its capacity. In some embodiments, the wireless base station buffer information includes the sizes of its uplink and downlink buffers used for storing data to be sent to the cable modem and for storing data received from the cable modem respectively. In some embodiments, the wireless base station buffer information also includes the buffer fill rates for the wireless base station uplink and downlink buffers used for storing data to be sent to the cable modem and for storing data received from the cable modem. Operation proceeds from step 3010 to step 3012.

In step 3012, the cable modem creates a cable modem uplink buffer and a cable modem downlink buffer. The cable modem uplink buffer is used for storing data received from the wireless base station and to be transmitted to the cable modem termination system. The cable modem downlink buffer is used for storing data received from the cable modem termination system and to be transmitted to the wireless base station. In various embodiments, the size of the cable modem uplink buffer and/or the cable modem downlink buffer is based on the cable modem termination system buffer information and the wireless base station buffer information. In some embodiments, the cable modem uplink buffer size is equal to or greater than the wireless base station uplink buffer size so that the wireless base station can transmit all of its stored data to the cable modem at one time, e.g., as a transmission burst. This can avoid the loss of data. In some embodiments, the cable modem downlink buffer size is equal to or grater than the wireless base station downlink buffer In most embodiments, the buffer size of the cable modem termination system is not an issue as it has a lot more capacity than the cable modem or the wireless base station and will not lose data received due to a buffer overload issue. In some embodiments, once the cable modem has created its uplink and downlink buffers it determines the amount of power the cable modem consumes to transmit a full downlink buffer and a full uplink buffer and reports this information to the CMTS power management device, e.g., CMTS power management device 152 of system 100.

In step 3014, the cable modem determines a power savings time value based on at least one of said wireless base station buffer information or said cable modem termination system buffer information. In some embodiments, step 3014 includes one or more sub-steps 3016 and 3018.

In sub-step 3016, the cable modem determines the power savings time value based on at least one of: (i) an amount of time for a wireless base station uplink buffer used for storing uplink data to be transmitted to the cable modem to fill up or reach its capacity, or (ii) an amount of time for the cable modem termination system downlink buffer used for storing downlink data to be transmitted to the cable mode to fill up or reach its capacity. The buffer information provided in steps 3006 and 3008 providing this information or information from which these amounts of times may be derived by the cable modem.

In sub-step 3018, the cable modem determines the power saving time value to be a value equal to or less than the smaller of: (i) an amount of time for a wireless base station uplink buffer used for storing uplink data to be transmitted to the cable modem to fill up or reach its capacity, or (ii) an amount of time for the cable modem termination system downlink buffer used for storing downlink data to be transmitted to the cable mode to fill up or reach its capacity. The buffer information provided in steps 3006 and 3008 providing this information or information from which these amounts of times may be derived by the cable modem. Operation proceeds from step 3014 via connection node A 3020 to step 3022 shown on FIG. 3B.

In step 3022, the cable modem while operating in a first mode of operation receives uplink data from the wireless base station. Operation proceeds from step 3022 to step 3024.

In step 3024, the cable modem stores the received uplink data at the cable modem in a cable modem uplink buffer. Operation proceeds from step 3024 to step 3026.

In step 3026, the cable modem while operating in the first mode of operation receives downlink data from the cable modem termination system. The downlink data having a destination of user equipment devices connected to the wireless base station. The downlink data being sent to the cable modem for transmission to the wireless base station. Operation proceeds from step 3026 to step 3028.

In step 3028, the cable modem stores the received downlink data at the cable modem in a cable modem downlink buffer. Operation proceeds from step 3028 to step 3030.

In step 3030, the cable modem waits until at least one of the following occurs: (i) the amount of data in the cable modem uplink buffer reaches a first threshold value, or (ii) the amount of data in the cable modem downlink buffer reaches a second threshold value, before transmitting either the stored downlink data or the stored uplink data. Operation proceeds from step 3030 to step 3032.

In step 3032, the cable modem switches from the first mode of operation to a second mode of operation after performing one or both of: (i) transmitting uplink data to the cable modem termination system, and (ii) transmitting downlink data to the wireless base station. The second mode of operation is a power savings mode of operation. In some embodiments step 3032 includes sub-step 3034. In sub-step 3034, the cable modem switches from the first mode of operation to the second mode of operation after performing both of: (i) transmitting uplink data to the cable modem termination system, and (ii) transmitting downlink data to the wireless base station. In most, but not all embodiments, the cable modem transmits all of the data in both its uplink and downlink before switching from the first mode of operation to the second mode of operation, i.e., it empties the uplink and downlink buffers. Operation proceeds from step 3032 to step 3036.

In step 3036, upon switching to the second mode of operation also referred to as the power savings mode of operation, the cable modem sends a first message to the wireless base station. The first message includes information indicating that the wireless base station is not to send data to the cable modem. This information may be indicated in a bit setting, e.g., a bit set to a 1 or a bit which is cleared, i.e., set to zero. Operation proceeds from step 3036 to step 3038.

In step 3038, upon switching to the second mode of operation also referred to as the power savings mode of operation, the cable modem sends a send message to the cable modem termination system. The second message includes information indicating that the cable modem termination system is not to send data to the cable modem. This information may be indicated in a bit setting, e.g., a bit set to a 1 or a bit which is cleared, i.e., set to zero. Operation proceeds from step 3038 to step 3042 shown on FIG. 3C via connection node B 3040.

In step 3042, upon switching to the power savings mode of operation, the cable modem sets a power saving timer to expire after a first amount of time based on an/or equal to determined power savings time value. In most embodiments, the cable modem will use a first amount of time slightly less than the determined power savings time value so as to ensure that the cable modem termination system downlink buffer and/or wireless base station uplink buffer do not overflow, e.g., to avoid the loss of data. Step 3042 is optional. If step 3042 is not implemented operation proceeds to step 3044 from step 3038.

In step 3044, upon switching to the power savings mode of operation and after sending the first message to the wireless base station and the second message to the cable modem termination system, the cable modem turns off power to one or more cable modem transmitters included in the cable modem. In some embodiments, step 3044 includes sub-step 3046. In sub-step 3046, upon switching to the power savings mode of operation, the cable modem turns off power to all of the transmitters included in the cable modem. Turning off power to the transmitter(s) saves power and makes the cable modem more power efficient. Operation proceeds from step 3044 to step 3048.

In step 3048, upon switching to the power savings mode of operation and after sending the first message to the wireless base station and the second message to the cable modem termination system, the cable modem turns off power to one or more cable modem receivers included in the cable modem. In some embodiments, step 3048 includes sub-step 3050. In sub-step 3050, upon switching to the power savings mode of operation, the cable modem turns off power to all of the receivers included in the cable modem. Turning off power to the receiver(s) saves power and makes the cable modem more power efficient. Operation proceeds from step 3048 to step 3052.

In step 3052, the cable modem remains in the power savings mode of operation for a first period of time. The first period of time being based on at least one of the cable modem termination system buffer information or the wireless base station buffer information. In some embodiments, step 3052 includes one or more sub-steps 3053 and 3054. In sub-step 3053, the cable modem remains in the power savings mode of operation for a first period of time. The first period of time being based on or equal to the power savings time value. In sub-step 3054, the cable modem remains in the power savings mode of operation until the expiration of the power saving timer. Operation proceeds from step 3052 to step 3056.

In step 3056, after the cable modem has remained in the power savings mode of operation for the first time period, the cable mode switches from the power saving mode of operation back to the first mode of operation. In some embodiments, step 3056 includes sub-step 3058. In sub-step 3058, the expiration of the power savings timer causes the cable modem to switch from the power savings mode of operation to the first mode of operation. Operation proceeds from step 3056 via connection node C 3060 to step 3062 shown on FIG. 3D.

In step 3062, upon the cable modem switching from the power savings mode of operation to the first mode of operation, the cable modem turns power on to (i) the one or more cable modem transmitters for which power had been turned off by the cable modem, and (ii) the one or more receivers for which the power had been turned off by the cable modem. Operation proceeds from step 3062 to step 3064.

In step 3064, after the cable modem turns on power to the one or more transmitters and one or more receivers, the cable modem transmits a message to the cable modem termination system including information indicating the cable modem termination system is to send data to the cable modem. This information may be indicated in a bit setting, e.g., a bit set to a 1 or a bit which is cleared, i.e., set to zero. Operation proceeds from step 3064 to step 3066.

In step 3066, after the cable modem turns on power to the one or more transmitters and one or more receivers, the cable modem transmits a message to the wireless base station including information indicating the wireless base station is to send data to the cable modem. This information may be indicated in a bit setting, e.g., a bit set to a 1 or a bit which is cleared, i.e., set to zero. Operation proceeds from step 3066 via connect node A 3020 to step 3022 shown on FIG. 3B where the method continues as previously described.

Figure 4:
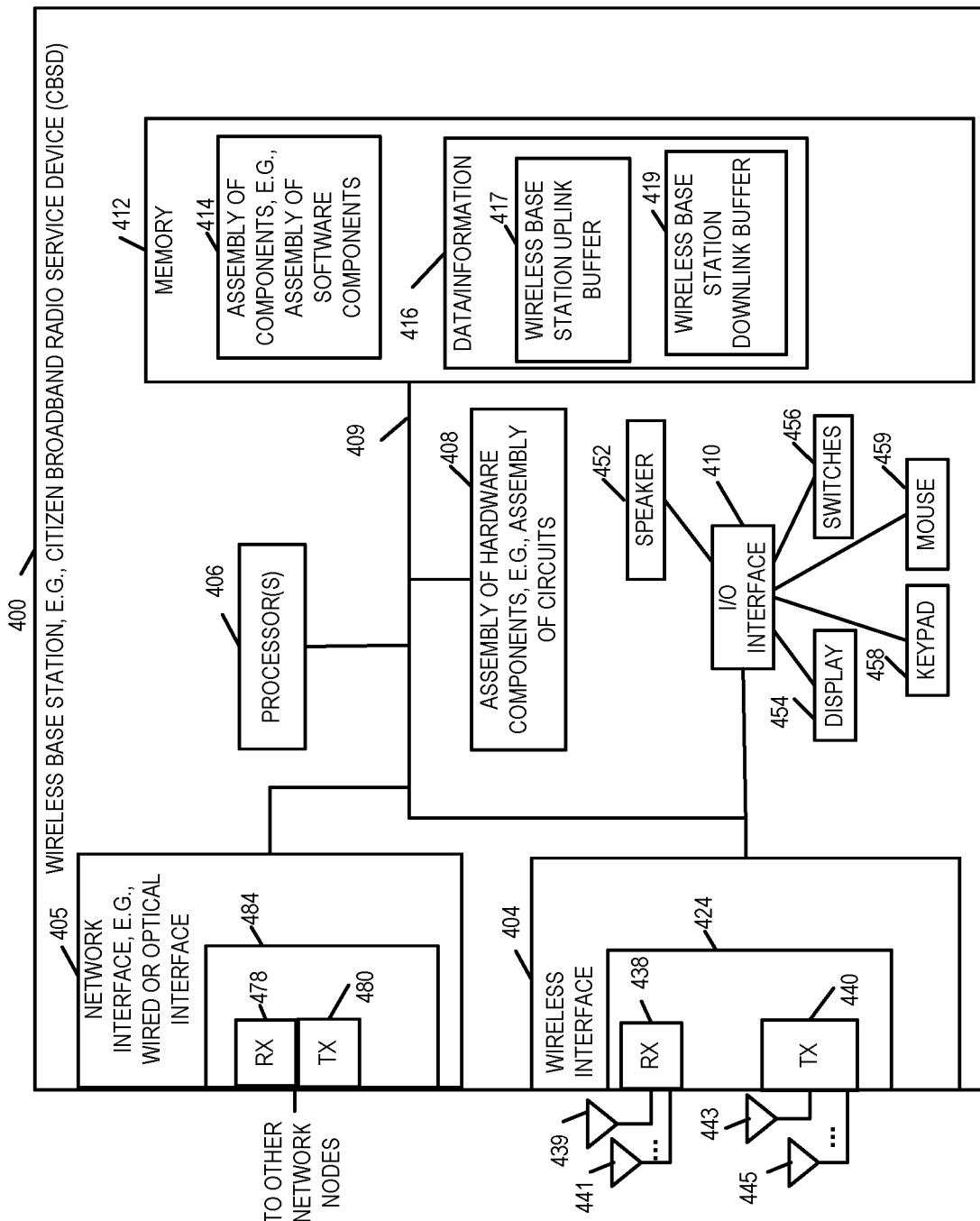
FIG. 4 illustrates details of an exemplary wireless base station (e.g., Citizens Broadband Radio Service Device (CBSD) in accordance with one embodiment of the present invention.

FIG. 4 is a drawing of an exemplary wireless base station (WBS) (e.g., Citizens Broadband Radio Service Device (CBSD), LTE base station, 4G base station, 5G base station) 400 in accordance with an exemplary embodiment. The wireless base station device (e.g., CBSD device) 400. In some embodiments, the wireless base station (e.g., CBSD device) 400 also includes the capabilities of a CBSD as defined by the Federal Communications Commission's Rules with Regard to Commercial Operations in the 3550-3650 MHz Band. Exemplary wireless base station (e.g., CBSD device) 400 includes a wireless interface 404, a network interface 405, e.g., a wired or optical interface, processor(s) 406 (one or more processors), e.g., a CPU, an assembly of hardware components 408, e.g., an assembly of circuits, and I/O interface 410 and memory 412 coupled together via a bus 409 over which the various elements may interchange data and information. Wireless base station 400 further includes a speaker 452, a display 454, switches 456, keypad 458 and mouse 459 coupled to I/O interface 410, via which the various I/O devices (452, 454, 456, 458, 459) may communicate with other elements (404, 405, 406, 408, 412) of the wireless base station 400. Network interface 405 includes a receiver 478 and a transmitter 480. In some embodiments, receiver 478 and transmitter 480 are part of a transceiver 484. Wireless interface 404 includes a wireless receiver 438 and a wireless transmitter 440. In some embodiments, receiver 438 and transmitter 440 are part of a transceiver 442. In various embodiments, wireless interface 404 includes a plurality of wireless receivers and a plurality of wireless transmitters. Wireless receiver 438 is coupled to a plurality of receive antennas (receive antenna 1 439, . . . , receive antenna M 441), via which wireless base station 400 can receive wireless signals from other wireless communications devices including a second wireless communications device, e.g., a UE device. Wireless transmitter 440 is coupled to a plurality of wireless transmit antennas (transmit antenna 1 443, . . . , transmit antenna N 445) via which the wireless base station 400 can transmit signals to other wireless communications devices including a second wireless communications device, e.g., a UE device. Memory 412 includes an assembly of component 414, e.g., an assembly of software components, and data/information 416. Data/information 416 includes wireless base station uplink buffer 417 and wireless base station downlink buffer 419. In some embodiments, the wireless base stations discussed in the Figures and/or in connection with the embodiments of the present invention described are implemented in accordance with wireless base station 400. For example, WBS 1 (e.g., CBSD 1) 102 and/or WBS 2 (e.g., CBSD 2) 112 of system 100, may be, and in some embodiments are, implemented in accordance with wireless base station 400.

Figure 5:
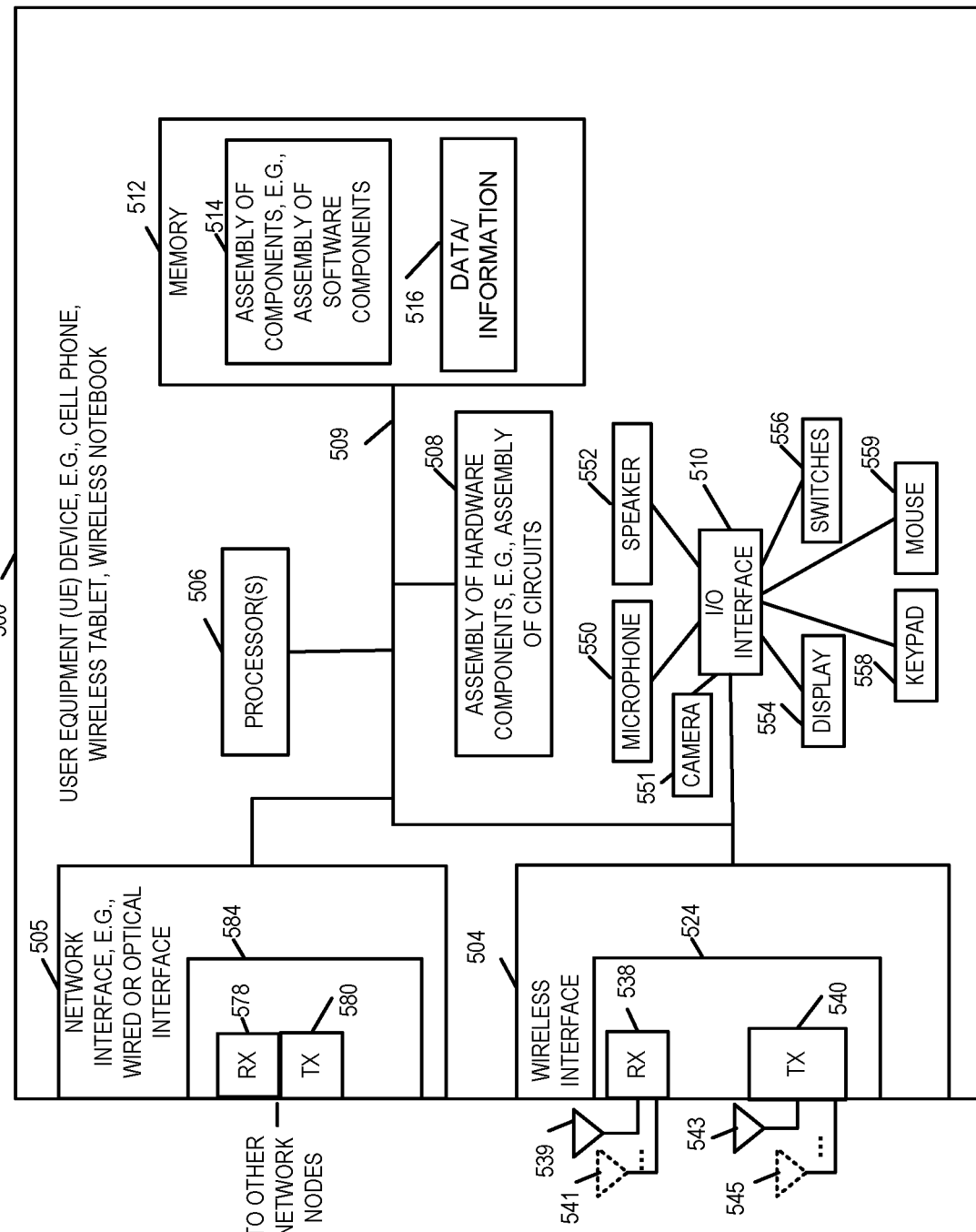
FIG. 5 illustrates details of an exemplary User Equipment (UE) device in accordance with one embodiment of the present invention.

FIG. 5 is a drawing of an exemplary user equipment (UE) device 500 in accordance with an exemplary embodiment. UE device 500 is, e.g., a mobile device such as a cell phone, a smart phone, wireless tablet or wireless notebook. UE device 500, in some embodiments, includes CBRS, 5G, Long Term Evolution (LTE), e.g., 4G LTE, mobile device capabilities. Exemplary UE device 500 includes a wireless interface 504, a network interface 505, a processor(s) 506, e.g., a CPU, an assembly of hardware components 508, e.g., an assembly of circuits, and I/O interface 510 and memory 512 coupled together via a bus 509 over which the various elements may interchange data and information. UE device 500 further includes a microphone 550, camera 551, speaker 552, a display 554, e.g., a touch screen display, switches 556, keypad 558 and mouse 559 coupled to I/O interface 510, via which the various I/O devices (550, 551, 552, 554, 556, 558, 559) may communicate with other elements (504, 505, 506, 508, 512) of the UE device. Network interface 505 includes a receiver 578 and a transmitter 580. In some embodiments, receiver 578 and transmitter 580 are part of a transceiver 584. Wireless interface 504 includes a wireless receiver 538 and a wireless transmitter 540. In some embodiments, receiver 538 and transmitter 540 are part of a transceiver 524. In various embodiments, wireless interface 504 includes a plurality of wireless receivers and a plurality of wireless transmitters. Wireless receiver 538 is coupled to one or more receive antennas (receive antenna 1 539, . . . , receive antenna M 541), via which UE device 500 can receive wireless signals from other wireless communications devices including, e.g., a wireless base station such as wireless base station 400. Wireless transmitter 540 is coupled to one or more wireless transmit antennas (transmit antenna 1 543, . . . , transmit antenna N 545) via which the UE device 500 can transmit signals to other wireless communications device including a first wireless communications device, e.g., a wireless base station 400. Memory 512 includes an assembly of components 514, e.g., an assembly of software components, and data/information 516. The user equipment devices illustrated in FIG. 1 may be, and in some embodiments are, implemented in accordance with user equipment device 500.

Figure 6:
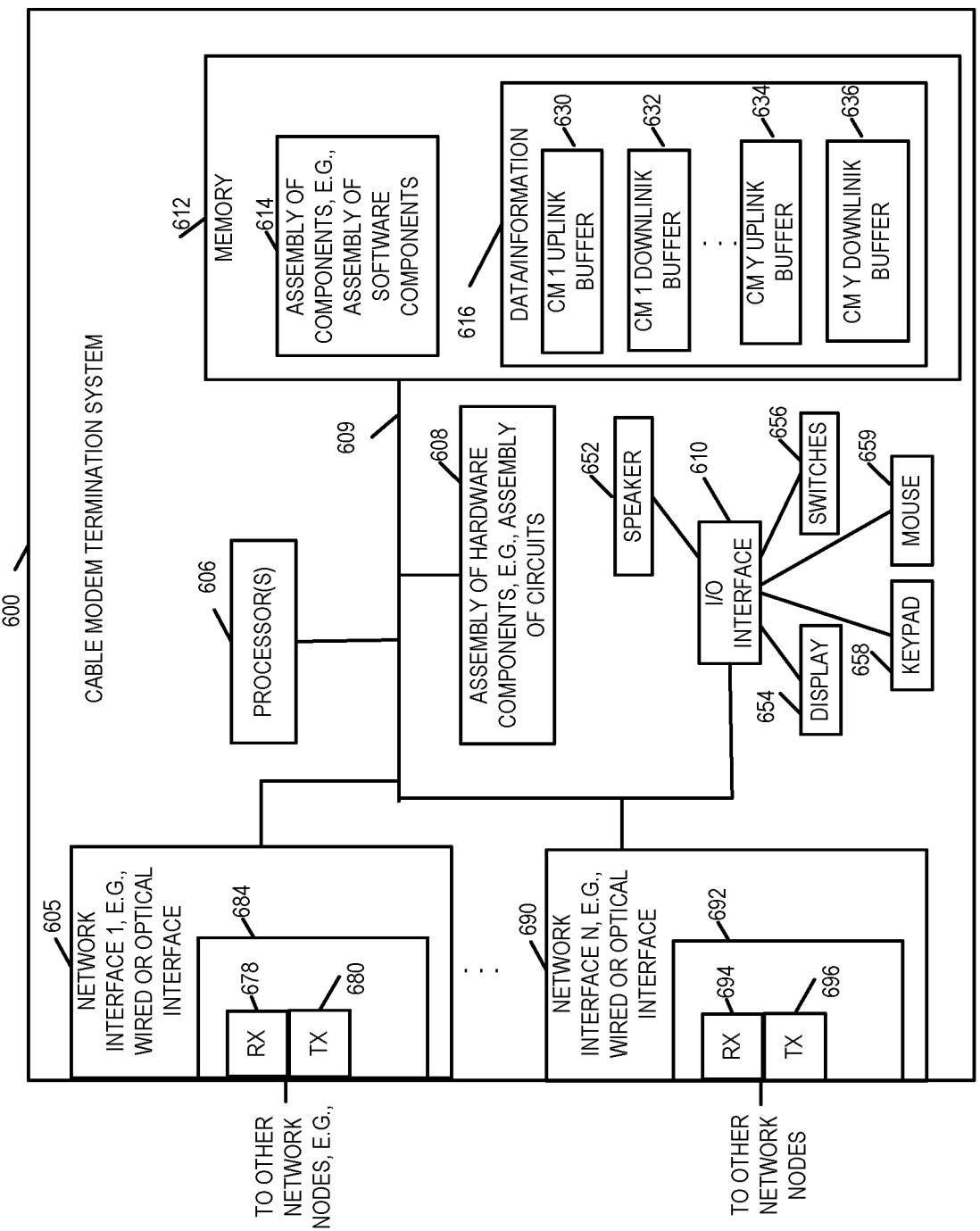
FIG. 6 illustrates details of an exemplary cable modem termination system in accordance with one embodiment of the present invention.

FIG. 6 is a drawing of an exemplary cable modem termination system in accordance with an exemplary embodiment. The cable modem termination system in some embodiments is implemented in accordance with DOCSIS standards. The cable modem termination system 600 includes a plurality of network interfaces 605, . . . , 690, e.g., a wired or optical interface, a processor(s) 606 (e.g., one or more processors), e.g., a CPU, an assembly of hardware components 608, e.g., an assembly of circuits, and I/O interface 610 and memory 612 coupled together via a bus 609 over which the various elements may interchange data and information. The computing device 600 further includes a speaker 652, a display 654, switches 656, keypad 658 and mouse 659 coupled to I/O interface 610, via which the various I/O devices (652, 654, 656, 658, 659) may communicate with other elements (605, . . . , 690, 606, 608, 612) of the cable modem termination system 600. Network interface 605 includes a receiver 678 and a transmitter 680. The network interface 605 is typically used to communicate with other devices, e.g., cable modems, CMTS power management device, other devices in the network core. In some embodiments, receiver 678 and transmitter 680 are part of a transceiver 684. Memory 612 includes an assembly of component 614, e.g., an assembly of software components, and data/information 616. Data/information 616 includes, among other things, uplink and downlink buffers for each cable modem to which it is connected. In this example, it includes cable modem termination system cable modem (CM) 1 uplink buffer 630, cable modem termination system CM 1 downlink buffer 632, . . . , cable modem termination system CM Y uplink buffer 634, and cable modem termination system CM Y downlink buffer 636. In some embodiments, cable modem termination systems disclosed in the figures and/or discussed in connection with the various embodiments of the invention are implemented in accordance with cable modem termination system 600. For example, cable modem termination system 1 122 and cable modem termination system 2 124 of system 100 of FIG. 1 are implemented in accordance with cable modem termination system 600.

Figure 7:
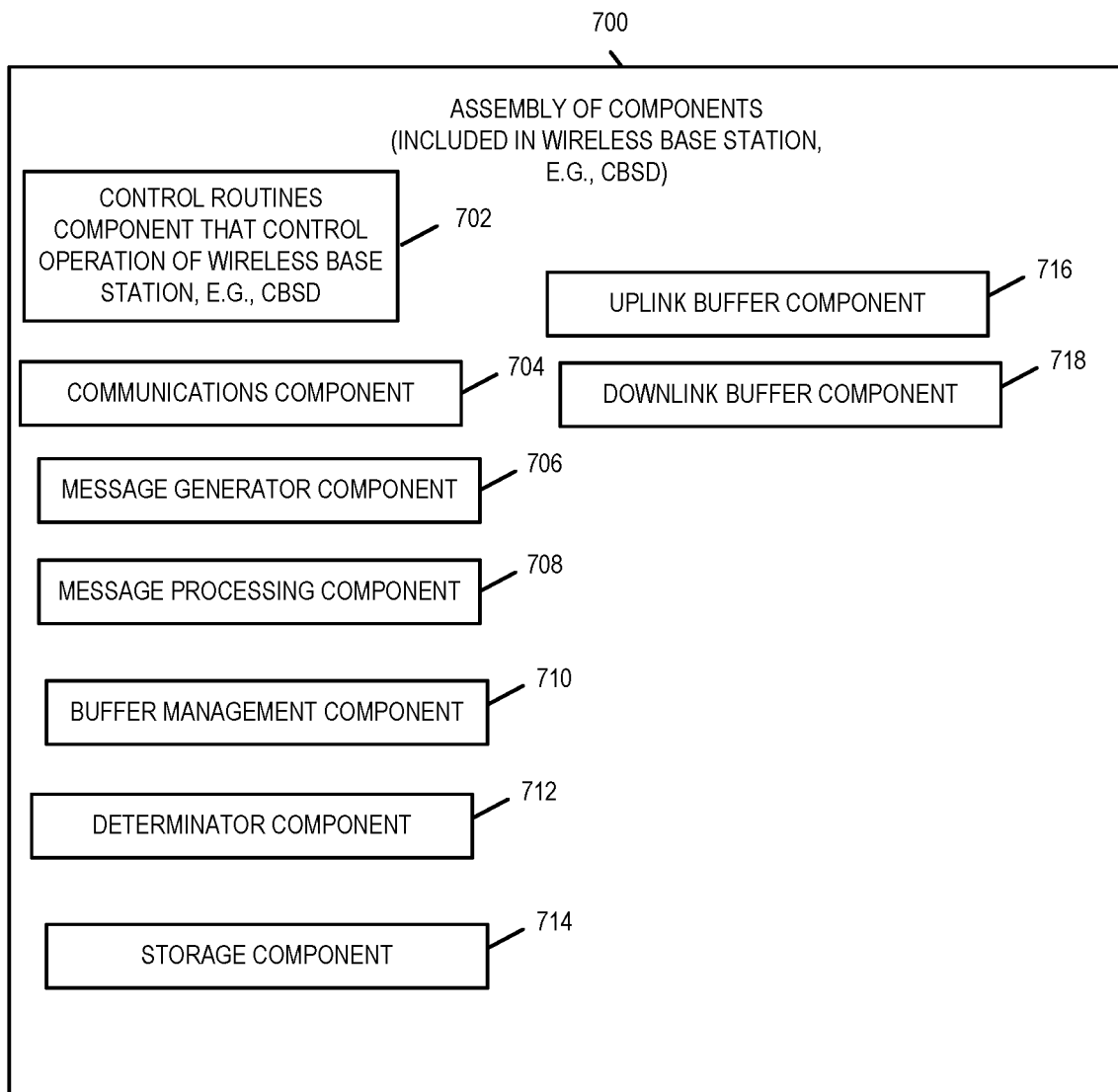
FIG. 7 illustrates an exemplary assembly of components for a wireless base station (e.g., CBSD) in accordance with an embodiment of the present invention.

FIG. 7 is a drawing of an exemplary assembly of components 700 which may be included in an exemplary wireless base station (e.g., exemplary wireless base station 400 of FIG. 4), in accordance with an exemplary embodiment. The components in the assembly of components 700 can, and in some embodiments are, implemented fully in hardware within a processor, e.g., processor 406, e.g., as individual circuits. The components in the assembly of components 700 can, and in some embodiments are, implemented fully in hardware within the assembly of hardware components 408, e.g., as individual circuits corresponding to the different components. In other embodiments some of the components are implemented, e.g., as circuits, within processor 406 with other components being implemented, e.g., as circuits within assembly of components 408, external to and coupled to the processor 406. As should be appreciated the level of integration of components on the processor and/or with some components being external to the processor may be one of design choice. Alternatively, rather than being implemented as circuits, all or some of the components may be implemented in software and stored in the memory 412 of the wireless base station 400, with the components controlling operation of wireless base station device 400 to implement the functions corresponding to the components when the components are executed by a processor e.g., processor 406. In some such embodiments, the assembly of components 700 is included in the memory 412 as assembly of software components 414. In still other embodiments, various components in assembly of components 700 are implemented as a combination of hardware and software, e.g., with another circuit external to the processor providing input to the processor which then under software control operates to perform a portion of a component's function.

When implemented in software the components include code, which when executed by a processor, e.g., processor 406, configure the processor to implement the function corresponding to the component. In embodiments where the assembly of components 700 is stored in the memory 412, the memory 412 is a computer program product comprising a computer readable medium comprising code, e.g., individual code for each component, for causing at least one computer, e.g., processor 406, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 7 control and/or configure the wireless base station 400 or elements therein such as the processor 406, to perform the functions of corresponding steps illustrated and/or described in the method of one or more of the flowcharts, signaling diagrams and/or described with respect to any of the Figures. Thus the assembly of components 700 includes various components that perform functions of corresponding one or more described and/or illustrated steps of an exemplary method.

Assembly of components 700 includes a control routines component 702, a communications component 704, a message generator component 706, a message processing component 708, a buffer management component 710, a determinator component 712, a storage component 714, an uplink buffer component 716, and a downlink buffer component 718.

The control routines component 702 is configured to control operation of the wireless base station (e.g., CBSD). The communication component 704 is configured to handle communications, e.g., transmission and reception of messages, and protocol signaling for the wireless base station (e.g., CBSD). The message generator component 706 is configured to generate messages for transmission to other devices. The message processing component 708 is configured to process messages received from other devices, e.g., messages from user equipment devices, messages from a cable modem, messages from an Spectrum Access System, and policy control function devices.

The buffer management component 710 is configured to implement all aspects related to buffer management including creation and management of uplink data buffer(s) for storing data from user equipment devices to be transmitted to the cable modem, creation of downlink buffer(s) for storing data received from the cable modem, providing wireless base station buffer information to the cable modem including uplink and downlink buffer size and fill rates, uplink and downlink buffer sizes in terms of time to receive and store data to fully occupy the uplink buffer and the downlink buffer.

The determinator component 712 is configured to make determinations and decisions for the wireless base station including for example: buffer size as an amount of time for the buffer to become full, buffer size as number of bytes of storage capacity, buffer fill rate, and when to send data to the cable modem and when not to send data to the cable modem, e.g., send data after receiving a send data message and do not send data after receiving a do not send data message, when to store data received from user equipment devices in the uplink buffer as opposed to sending the data immediately to the cable modem (e.g., store data in the uplink buffer after receiving a do not send data message is received from the cable modem).

The storage component 714 is configured to manage the storage, and retrieval of data and/or instructions to/and from memory, buffers in memory, hardware buffers and/or storage device coupled and/or connected to the wireless base station.

The uplink buffer component 716 is configured to handle uplink buffer creation, management, storage and retrieval of data to the uplink buffer, flushing and/or transmittal of data from the uplink buffer to the cable modem, provide notifications when thresholds have been exceeded with respect to buffer storage, provide notifications when the uplink buffer is full, determine the uplink buffer size, determine uplink buffer fill rate, determine amount of time it takes for the uplink buffer to become full, respond to queries and/or requests from the cable modem to provide uplink buffer information. In some embodiments, uplink buffer component 716 is a sub-component of buffer management component 710 or storage component 714.

The downlink buffer component 718 is configured to handle downlink buffer creation, management, storage and retrieval of data to the downlink buffer, flushing and/or transmittal of data from the downlink buffer to the user equipment devices, provide notifications when thresholds have been exceeded with respect to buffer storage, provide notifications when the downlink buffer is full, determine the downlink buffer size, determine downlink buffer fill rate, determine amount of time it takes for the downlink buffer to become full, respond to queries and/or requests from the cable modem to provide downlink buffer information. In some embodiments, downlink buffer component 718 is a sub-component of buffer management component 710 or storage component 714.

Figure 8:
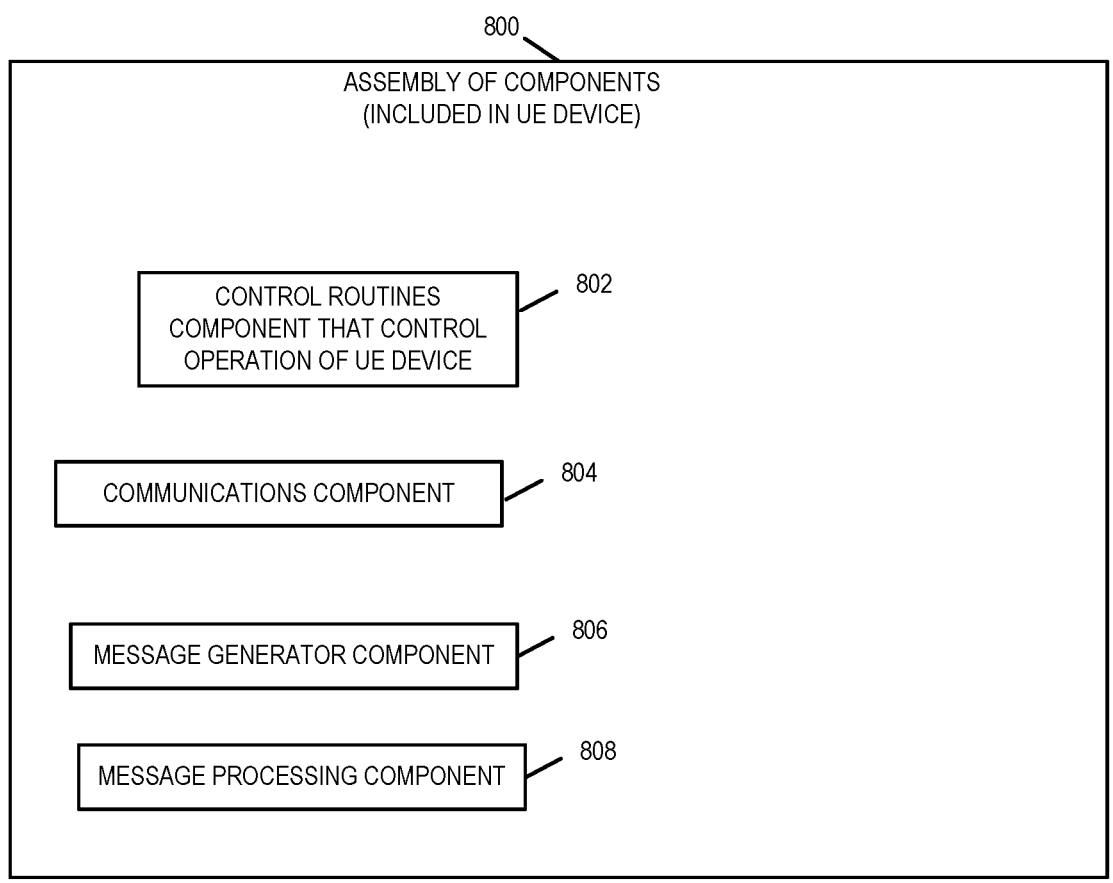
FIG. 8 illustrates an exemplary assembly of components for a user equipment device in accordance with an embodiment of the present invention.

FIG. 8 is a drawing of an exemplary assembly of components 800 which may be included in an exemplary user equipment (UE) device, e.g., UE device 500 of FIG. 5, in accordance with an exemplary embodiment. The components in the assembly of components 800 can, and in some embodiments are, implemented fully in hardware within a processor, e.g., processor 506, e.g., as individual circuits. The components in the assembly of components 800 can, and in some embodiments are, implemented fully in hardware within the assembly of hardware components 508, e.g., as individual circuits corresponding to the different components. In other embodiments some of the components are implemented, e.g., as circuits, within processor 506 with other components being implemented, e.g., as circuits within assembly of components 508, external to and coupled to the processor 506. As should be appreciated the level of integration of components on the processor and/or with some components being external to the processor may be one of design choice. Alternatively, rather than being implemented as circuits, all or some of the components may be implemented in software and stored in the memory 512 of the UE device 500, with the components controlling operation of UE device 500 to implement the functions corresponding to the components when the components are executed by a processor e.g., processor 506. In some such embodiments, the assembly of components 800 is included in the memory 512 as assembly of software components 514. In still other embodiments, various components in assembly of components 800 are implemented as a combination of hardware and software, e.g., with another circuit external to the processor providing input to the processor which then under software control operates to perform a portion of a component's function. When implemented in software the components include code, which when executed by a processor, e.g., processor 506, configure the processor to implement the function corresponding to the component. In embodiments where the assembly of components 800 is stored in the memory 512, the memory 512 is a computer program product comprising a computer readable medium comprising code, e.g., individual code for each component, for causing at least one computer, e.g., processor 506, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 8 control and/or configure the UE device 500 or elements therein such as the processor 506, to perform the functions of corresponding steps illustrated and/or described in the method of one or more of the flowcharts, signaling diagrams and/or described with respect to any of the Figures. Thus the assembly of components 800 includes various components that perform functions of corresponding one or more described and/or illustrated steps of an exemplary method.

Assembly of components 800 includes a control routines component 802, a communications component 804, a message generator component 806, a message processing component 808.

The control routines component 802 is configured to control operation of the UE. The communication component 804 is configured to handle communications, e.g., receipt and transmission of signals and provide protocol signal processing for one or protocols for the UE. The message generator component 806 is configured to generate messages for transmission to the wireless base stations (e.g., CBSD devices) such as messages including user data and/or user data requests, control messages, etc. In some embodiments, the message generator component 806 is a sub-component of the communications component 804. The message processing component 808 processes received messages, e.g., requests for information. In some embodiments, the message processing component is a sub-component of the communications component 808.

Figure 9:
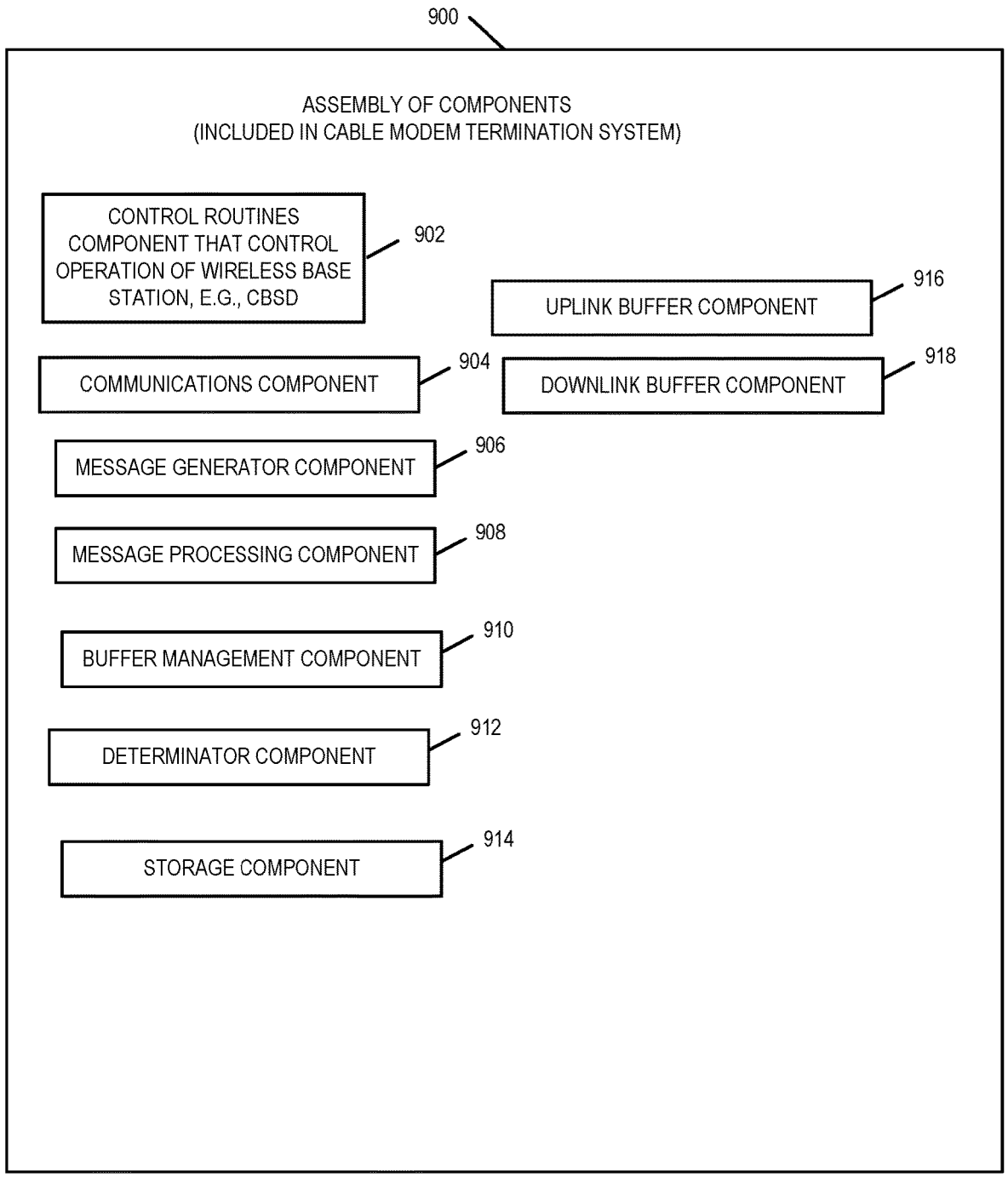
FIG. 9 illustrates an exemplary assembly of components for a cable modem termination system in accordance with an embodiment of the present invention.

FIG. 9 is a drawing of an exemplary assembly of components 900 which may be included in a cable modem termination system, e.g., cable modem termination system 600 of FIG. 6, in accordance with an exemplary embodiment. The components in the assembly of components 900 can, and in some embodiments are, implemented fully in hardware within a processor or one or more processors, e.g., processor(s) 606, e.g., as individual circuits. The components in the assembly of components 900 can, and in some embodiments are, implemented fully in hardware within the assembly of hardware components 608, e.g., as individual circuits corresponding to the different components. In other embodiments some of the components are implemented, e.g., as circuits, within processor(s) 606 with other components being implemented, e.g., as circuits within assembly of components 608, external to and coupled to the processor(s) 606. As should be appreciated the level of integration of components on the processor and/or with some components being external to the processor may be one of design choice. Alternatively, rather than being implemented as circuits, all or some of the components may be implemented in software and stored in the memory 612 of the cable modem termination system 600, with the components controlling operation of the cable modem termination system 600 to implement the functions corresponding to the components when the components are executed by a processor e.g., processor 606. In some such embodiments, the assembly of components 900 is included in the memory 612 as assembly of software components 614. In still other embodiments, various components in assembly of components 900 are implemented as a combination of hardware and software, e.g., with another circuit external to the processor providing input to the processor which then under software control operates to perform a portion of a component's function.

When implemented in software the components include code, which when executed by a processor or one or more processors, e.g., processor(s) 606, configure the processor(s) to implement the function corresponding to the component. In embodiments where the assembly of components 900 is stored in the memory 612, the memory 612 is a computer program product comprising a computer readable medium comprising code, e.g., individual code for each component, for causing at least one computer, e.g., processor 606, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 9 control and/or configure the cable modem termination system 600 or elements therein such as the processor(s) 606, to perform the functions of corresponding steps illustrated and/or described in the method of one or more of the flowcharts, signaling diagrams and/or described with respect to any of the Figures. Thus the assembly of components 900 includes various components that perform functions of corresponding one or more described and/or illustrated steps of an exemplary method.

Assembly of components 900 includes a control routines component 902, a communications component 904, a message generator component 906, a message processing component 908, a buffer management component 910, a determinator component 912, a storage component 914, an uplink buffer component 916, and a downlink buffer component 918.

The control routines component 902 is configured to control operation of the cable modem termination system. The communication component 904 is configured to handle communications, e.g., transmission and reception of messages, and protocol signaling for the cable modem termination system. The message generator component 906 is configured to generate messages for transmission to other devices. The message processing component 908 is configured to process messages received from other devices, e.g., messages from cable modems, messages from core network, and messages from CMTS power management devices.

The buffer management component 910 is configured to implement all aspects related to buffer management including creation and management of uplink data buffer(s) for storing data from cable modem devices to be transmitted to the core network devices, creation of downlink buffer(s) for storing data received from devices, e.g., core network devices for transmission to the cable modem, providing cable modem termination system buffer information to cable modems including uplink and downlink buffer size and fill rates, uplink and downlink buffer sizes in terms of time to receive and store data to fully occupy the uplink buffer and the downlink buffer corresponding to a particular cable modem.

The determinator component 912 is configured to make determinations and decisions for the cable modem including for example: buffer size as an amount of time for the buffer to become full, buffer size as number of bytes of storage capacity, buffer fill rate, and when to send data to the cable modem and when not to send data to the cable modem, e.g., send data after receiving a send data message and do not send data after receiving a do not send data message, when to store data received from other devices for a cable in the downlink buffer for the cable modem as opposed to sending the data immediately to the cable modem (e.g., store data in the downlink buffer after receiving a do not send data message is received from the cable modem).

The storage component 914 is configured to manage the storage, and retrieval of data and/or instructions to/and from memory, buffers in memory, hardware buffers and/or storage device coupled and/or connected to the wireless base station.

The uplink buffer component 916 is configured to handle uplink buffer creation, management, storage and retrieval of data to the uplink buffer, flushing and/or transmittal of data from the uplink buffer to the other devices, e.g., devices in the core network, provide notifications when thresholds have been exceeded with respect to buffer storage, provide notifications when the uplink buffer is full, determine the uplink buffer size, determine uplink buffer fill rate, determine amount of time it takes for the uplink buffer to become full, respond to queries and/or requests from the cable modem to provide uplink buffer information. In some embodiments, uplink buffer component 916 is a sub-component of buffer management component 910 or storage component 914.

The downlink buffer component 918 is configured to handle downlink buffer creation, management, storage and retrieval of data to the downlink buffer, flushing and/or transmittal of data from the downlink buffer to the cable modem, provide notifications when thresholds have been exceeded with respect to buffer storage, provide notifications when the downlink buffer is full, determine the downlink buffer size, determine downlink buffer fill rate, determine amount of time it takes for the downlink buffer to become full, respond to queries and/or requests from the cable modem to provide downlink buffer information, determine when the downlink buffer should not send data to the cable modem but should instead store the data (e.g., after receiving a do not send data message), determine when to send data/flush the downlink buffer to the cable modem (e.g., after receiving a send data message). In some embodiments, downlink buffer component 718 is a sub-component of buffer management component 910 or storage component 914.

Figure 11:
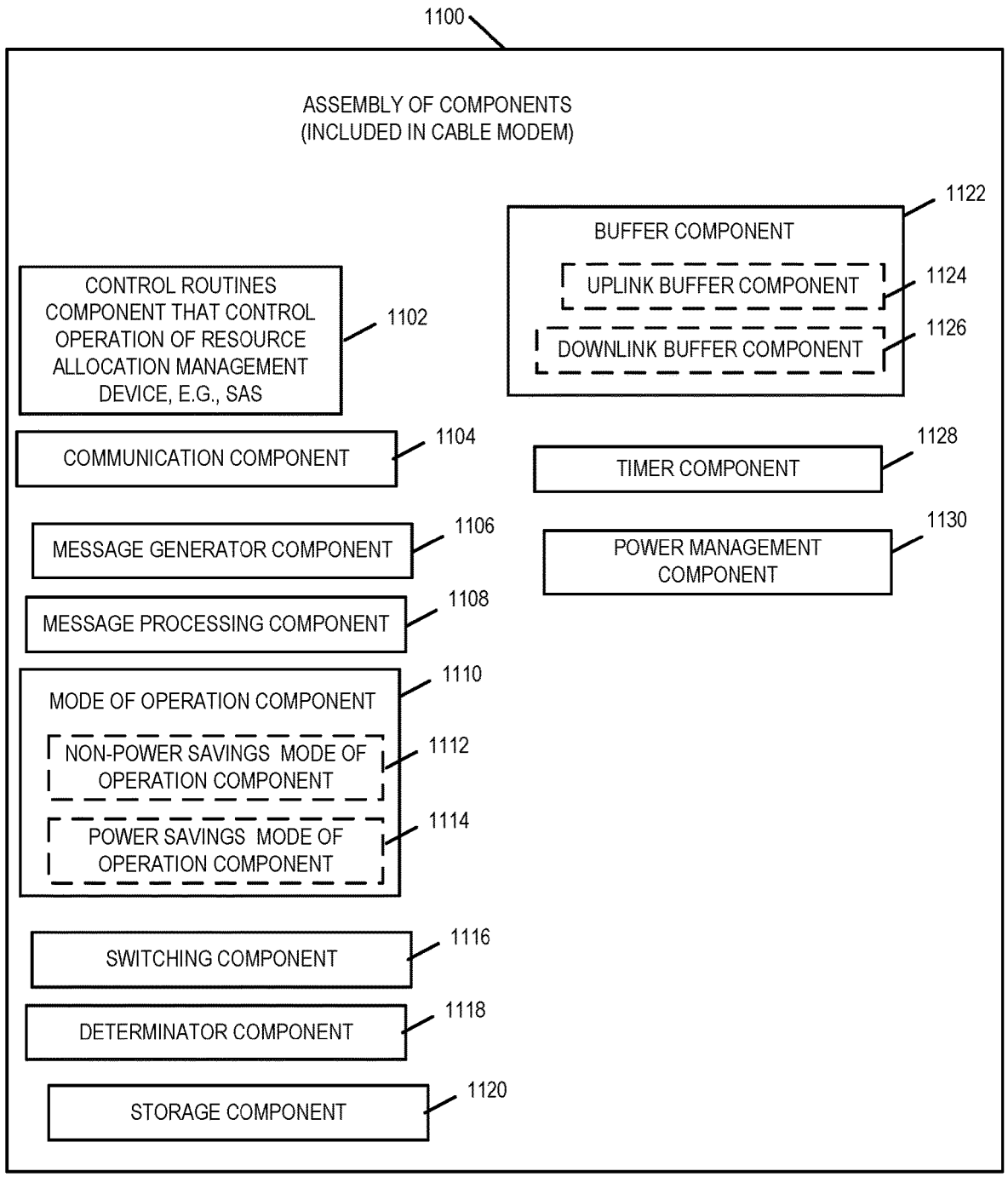
FIG. 11 illustrates details of an exemplary assembly of components for a cable modem in accordance with an embodiment of the present invention.

FIG. 11 is a drawing of an exemplary assembly of components 1100 which may be included in an exemplary cable modem (e.g., exemplary cable modem 200 of FIG. 2), in accordance with an exemplary embodiment. The components in the assembly of components 200 can, and in some embodiments are, implemented fully in hardware within a processor, e.g., processor 206, e.g., as individual circuits. The components in the assembly of components 200 can, and in some embodiments are, implemented fully in hardware within the assembly of hardware components 208, e.g., as individual circuits corresponding to the different components. In other embodiments some of the components are implemented, e.g., as circuits, within processor 206 with other components being implemented, e.g., as circuits within assembly of components 208, external to and coupled to the processor 206. As should be appreciated the level of integration of components on the processor and/or with some components being external to the processor may be one of design choice. Alternatively, rather than being implemented as circuits, all or some of the components may be implemented in software and stored in the memory 212 of the cable modem 200, with the components controlling operation of cable modem 200 to implement the functions corresponding to the components when the components are executed by a processor e.g., processor 206. In some such embodiments, the assembly of components 1100 is included in the memory 212 as assembly of software components 214. In still other embodiments, various components in assembly of components 1100 are implemented as a combination of hardware and software, e.g., with another circuit external to the processor providing input to the processor which then under software control operates to perform a portion of a component's function.

When implemented in software the components include code, which when executed by a processor, e.g., processor 206, configure the processor to implement the function corresponding to the component. In embodiments where the assembly of components 200 is stored in the memory 212, the memory 212 is a computer program product comprising a computer readable medium comprising code, e.g., individual code for each component, for causing at least one computer, e.g., processor 406, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 2 control and/or configure the cable modem 200 or elements therein such as the processor 206, to perform the functions of corresponding steps illustrated and/or described in the method of one or more of the flowcharts, signaling diagrams and/or described with respect to any of the Figures. Thus the assembly of components 1100 includes various components that perform functions of corresponding one or more described and/or illustrated steps of an exemplary method.

Assembly of components 1100 includes a control routines component 1102, a communications component 1104, a message generator component 1106, a message processing component 1108, a mode of operation component 1110, a switching component 1116, a determinator component 1118, a storage component 1120, a buffer component 1122, a timer component 1128, and a power management component 1130. In some embodiments, the mode of operation component 1110 includes one or more of the following sub-components: a non-power savings mode of operation component 1112 and a power savings mode of operation component 1114. In some embodiments, the buffer component 1122 includes one or more of the following sub-components: an uplink buffer component 1124 and a downlink buffer component 1126.

The control routines component 1102 is configured to control operation of the cable modem. The communication component 1104 is configured to handle communications, e.g., transmission and reception of messages, data packets, and protocol signaling for the cable modem. The message generator component 1106 is configured to generate messages for transmission to other devices such as for example messages indicating that data is not to be sent to the cable modem, messages indicating that data is to be sent to the data modem, messages including data packets for uplink transmission to a CMTS and messages including data packets for downlink transmission to a wireless base station, messages requesting buffer information, e.g., CMTS buffer information and wireless base station buffer information. The message processing component 1108 is configured to process messages received from other devices, e.g., messages such as messages including buffer information and/or data packets from a wireless base station, messages including buffer information and/or data packets from a cable modem termination system.

The mode of operation component 1110 is configured to control the cable mode to perform operations and steps of the methods disclosed herein while operating in the power savings mode of operation and the non-power savings mode of operation. In some embodiments, the mode of operation component 1110 is also makes determinations as to when the cable modem is to enter or exit either the power savings mode of operation or the non-power savings mode of operation. In some embodiments, the mode of operation component 1110 controls the cable modem to switch from the power savings mode of operation to the non-power savings mode of operation. In some embodiments, the mode of operation component 1110 controls the cable modem to switch from the non-power savings mode of operation to the power savings mode of operation.

In some embodiments, the mode of operation component includes a non-power savings mode of operation sub-component 1112. The non-power savings mode of operation sub-component 1112 is configured to control the cable modem to perform one or more of the various method steps described herein and/or attributed to the cable modem while it is operating in the non-power savings mode of operation including for example turning on transmitter(s) and receiver(s) which were turned off turning the power savings mode of operation, notifying the wireless base station and cable modem termination system that data should be sent to the cable modem via controlling the cable modem to transmit "Send data messages" to the cable modem termination system and the wireless base station, storing data which is received from the wireless base station in the uplink data buffer until a determination is made to send the data to CMTS (e.g., when the uplink and downlink buffer have reached a fullness threshold), storing data which is received from the CMTS in a downlink buffer until a determination is made to send the data to the wireless base station.

In some embodiments, the mode of operation component includes a power savings mode of operation sub-component 1114. The power savings mode of operation sub-component 1114 is configured to control the cable modem to perform one or more of the various method steps described herein and/or attributed to the cable modem while it is operating in the power savings mode of operation including for example, sending do The switching component 1116 is configured to control the cable modem to: (i) switch from a first mode of operation to a second mode of operation, and (ii) switch from a second mode of operation to a first mode of operation. The first mode of operation may be and typically is a non-power savings mode of operation and the second mode of operation is typically a power savings mode of operation. In some embodiments, the switching component is also configured to make the determination of when the cable modem is to switch: (i) from the first mode of operation to the second mode of operation, and (ii) from the second mode of operation to the first mode of operation. In some embodiments, the switching component 1116 is a sub-component of the mode of operation component 1114.

The determinator component 1118 is configured to make determinations and decisions for the cable modem including for example: whether an amount of data in a buffer has reached or exceeded a threshold, whether the cable modem is to switch from one mode of operation to another mode of operation, whether the cable modem is to store data in its uplink or downlink buffer or transmit the uplink and downlink data, whether the cable modem is to transmit it data or continue to wait until at least one of the following occurs: (i) the amount of data in the cable modem uplink buffer reaches a first threshold value, or (ii) the amount of data in the cable modem downlink buffer reaches a second threshold value to transmit the data in uplink or downlink before transmitting data, when to store data received from wireless base station in the uplink buffer as opposed to sending the data to the CMTS; when to transmit data, when to send a message indicating data is not to be sent to the cable modem by the wireless base station, when to send a message indicating data is not to be sent to the cable modem by the cable modem termination system, when to send a message indicating data is to be sent to the cable modem from the wireless base station, when to send a message indicating data is to be sent to the cable modem from the CMTS, when to start a power savings timer, when to enter power savings mode of operation, when to enter non-power savings mode of operation, when to turn off the cable modem transmitter(s), receiver(s), and/or transceiver(s), when to turn on the cable modem transmitter(s), receiver(s), and/or transceiver(s), when to flush the uplink and downlink cable modem buffers transmitting the data in a burst to the CMTS and the wireless base station, the expiration of the first period of time, the size to create the cable modem uplink buffer, the size to create the cable modem downlink buffer.

The storage component 1120 is configured to manage the storage, and retrieval of data and/or instructions to/and from memory, buffers in memory, hardware buffers and/or storage devices coupled and/or connected to the cable modem.

The buffer t component 1122 is configured to control the cable modem to implement all aspects related to buffer management including creation and management of an uplink data buffer for storing data from wireless base station to be transmitted to the cable modem termination system, creation of downlink buffer for storing data received from the cable modem termination system, receiving wireless base station buffer information including uplink and downlink buffer size and fill rates, uplink and downlink buffer sizes in terms of time to receive and store data to fully occupy the uplink buffer and the downlink buffer of the wireless base station, receiving cable modem termination system buffer information including uplink and downlink buffer size and fill rates, uplink and downlink buffer sizes in terms of time to receive and store data to fully occupy the uplink buffer and the downlink buffer of the cable modem termination system, determination of cable modem uplink and downlink buffer sizes, determination of when the amount of data stored in the cable modem uplink buffer has reached a first threshold, determination of when the amount of data stored in the cable modem downlink buffer has reached a second threshold, determination of when the cable modem uplink buffer data is to be transmitted to the cable modem termination system, determination of when the cable modem downlink buffer data is transmitted to the wireless base station, determination of when the uplink data is to be stored in the uplink buffer, determination of when the downlink data is to be stored in the downlink buffer. In some embodiments, the buffer component 1122 is a sub-component of the storage component 1120.

In some embodiments the buffer component 1122 includes uplink buffer component 1124. The uplink buffer component 1124 is a sub-component of the buffer component 1122 and is configured to perform operations relating to the uplink buffer including uplink buffer creation, management, storage and retrieval of data to the uplink buffer, flushing and/or transmittal of data from the uplink buffer to the cable modem termination system, providing notifications when thresholds have been met or exceeded with respect to buffer storage, providing notifications when the uplink buffer is full, determine the uplink buffer size, determine uplink buffer fill rate, determine amount of time it takes for the uplink buffer to become full. In some embodiments, uplink buffer component 1124 is not a sub-component of buffer component 1122 but is a separate component. In some embodiments, the uplink buffer component 1124 is a sub-component of the storage component 1120.

In some embodiments the buffer component 1122 includes downlink buffer component 1126. The downlink buffer component 1126 is a sub-component of the buffer component 1122 and is configured to perform operations relating to the downlink buffer including downlink buffer creation, management, storage and retrieval of data to the downlink buffer, flushing and/or transmittal of data from the downlink buffer to the wireless base station, providing notifications when thresholds have been met or exceeded with respect to buffer storage, providing notifications when the downlink buffer is full, determine the downlink buffer size, determine downlink buffer fill rate, determine amount of time it takes for the downlink buffer to become full. In some embodiments, downlink buffer component 1126 is not a sub-component of buffer component 1122 but is a separate component. In some embodiments, the downlink buffer component 1126 is a sub-component of the storage component 1120.

The timer component is configured to implement the power savings timer operations of the cable modem as well as setting of the power savings timer, causing the cable modem to switch modes of operation at the expiration or passage of the first period of time. In some embodiments, the timer components is a sub-component of the mode of operation component 1110 or the switching component 1116.

The power component 1128 is configured to receive and power supply and to control the management of the power usage by the cable modem including for example which elements, circuits, components, transceivers, receivers and transmitters are powered on and when (e.g., cable modem transmitters and receivers are powered on during non-power savings mode of operation) and powered off and when (e.g., turning off the cable modem transmitter(s) and receiver(s) after entering power savings mode of operation). The power component 1128 is also configured to receive power from the cable modem termination system, e.g., via Power over Ethernet. The power component 1128 is also configured to provide and/or supply power to the wireless base station, e.g., via Power over Ethernet, and to ensure that power to the wireless base station is not interrupted while the cable modem is in power savings mode of operation that is the cable modem.

FIG. 10 which illustrates the steps of a flowchart of a method 1000 which illustrates another exemplary method embodiment for managing power usage by a cable modem.

For explanatory purposes the exemplary method 1000 will be explained in connection with the exemplary communications system 100 illustrated in FIG. 1 wherein the wireless network is a CBRS network, wireless base stations are CBSD devices, the resource allocation management devices are SAS devices, the user equipment devices are mobile terminals, and cables connect the cable modem 1 104, . . . , CM Y 114 to the cable modem termination system 1 122. The cable modem termination system 1 122 supplying power to the cable modems which in turn supplies power to the wireless base station 1 (CBSD 1) 102 and wireless base station 2 (CBSD 2) 112. However, it should be understood that the method may be implemented using other systems, e.g., other non-CBRS wireless systems as well as other system configurations then those illustrated in FIG. 1. While it will be readily understood that additional steps and signaling are performed in connection with communicating information, messages, and packets between devices, the method 1000 focuses on and discusses the steps and signaling for understanding the invention.

Figure 10A:
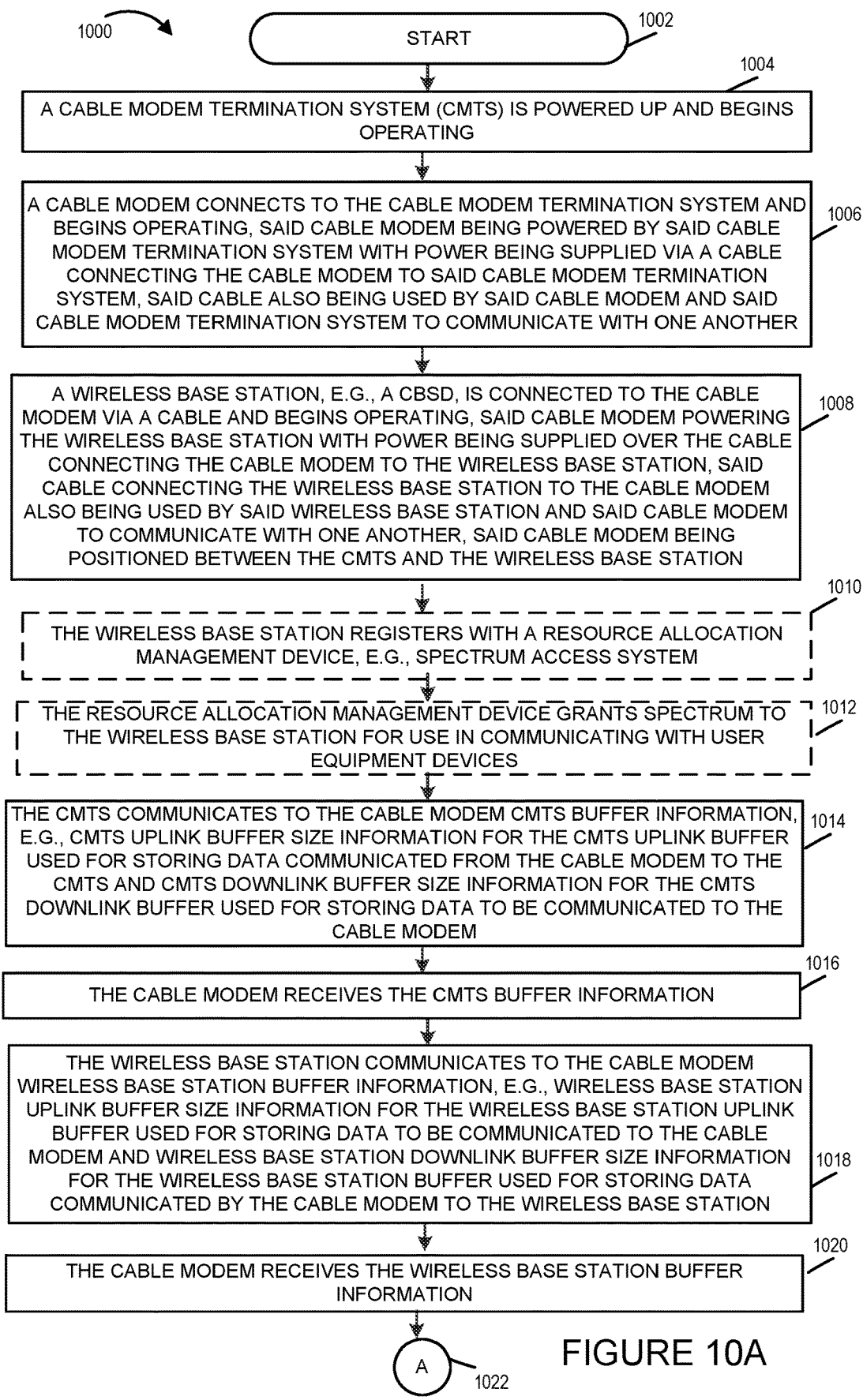
FIG. 10A illustrates the steps of the first part of an exemplary method in accordance with one embodiment of the present invention.
Figure 10B:
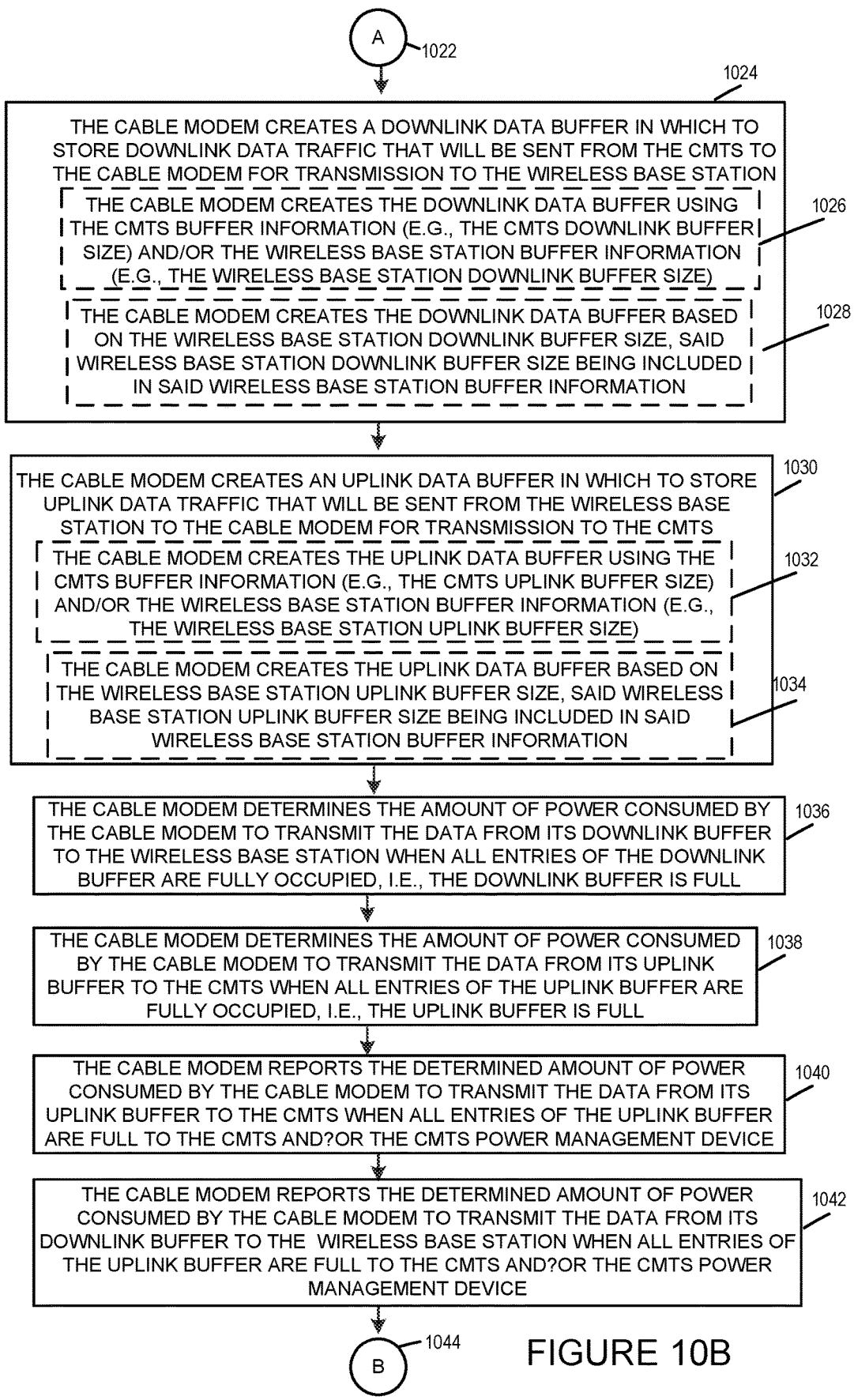
FIG. 10B illustrates the steps of the second part of an exemplary method in accordance with one embodiment of the present invention.
Figure 10D:
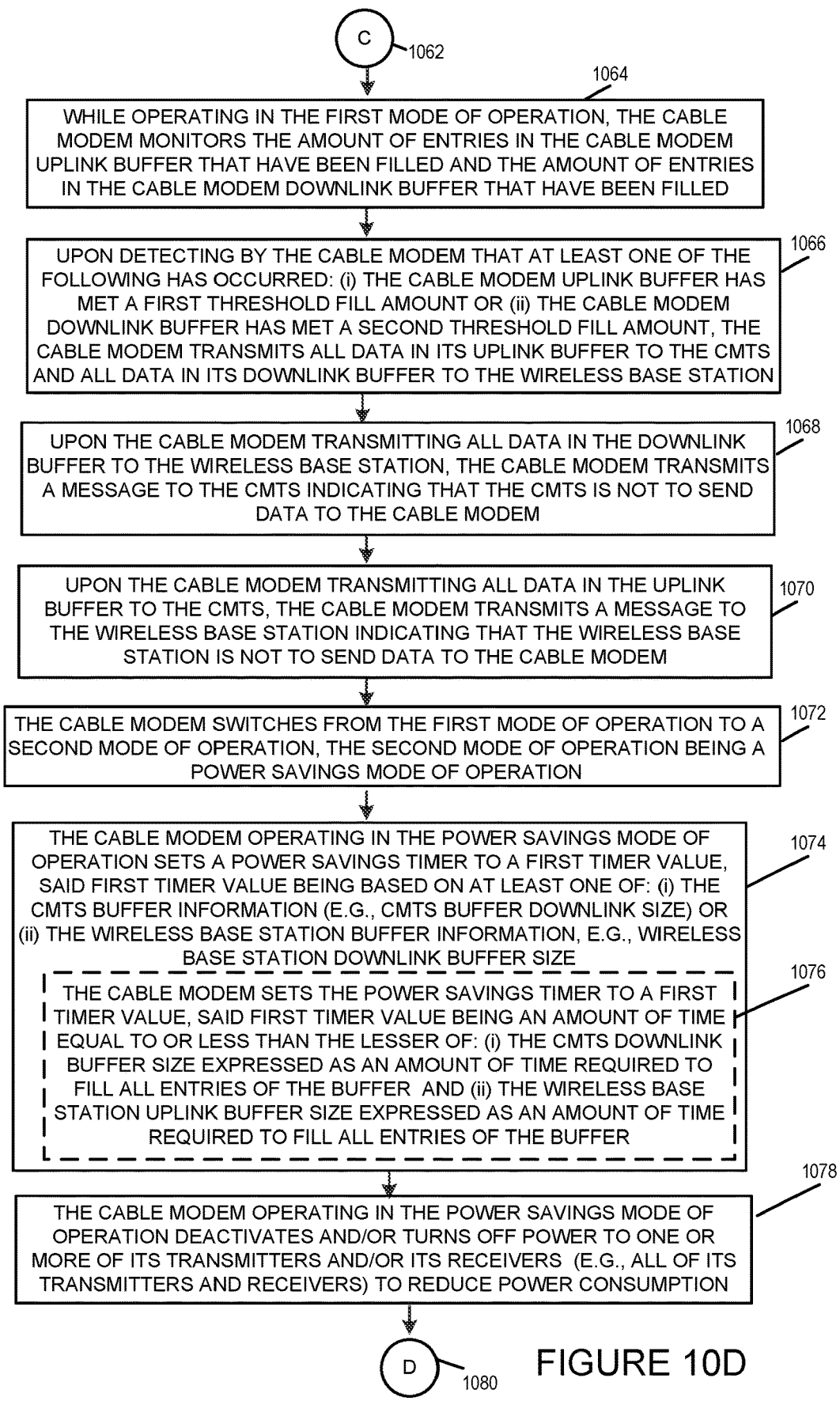
FIG. 10D illustrates the steps of the fourth part of an exemplary method in accordance with one embodiment of the present invention.

The method 1000 shown in FIG. 10 will now be discussed in detail. The method starts in start step 1002 shown on FIG. 10A.

Operation proceeds from start step 1002 to step 1004. In step 1004, a cable modem termination system (e.g., cable modem termination system 1 122 of system 100) is powered up and begins operating. Operation proceeds from step 1004 to step 1006.

In step 1006, a cable modem (e.g., cable modem 1 104 of system 100) connects to the cable modem termination system and begins operating. The cable modem is powered by the cable modem termination system with power being supplied via a cable connecting the cable modem to the cable modem termination system. The cable is also used by the cable modem termination system and the cable modem to communicate with one another. In at least some embodiments, the power is supplied using power over Ethernet protocols, technologies and/or connections. Operation proceeds from step 1006 to step 1008.

In step 1008, a wireless base station (e.g., wireless base station 102 (e.g., a CSBD) of system 100) is connected to the cable modem via a cable and begins operating. The cable modem supplies power to the wireless base station. The power is supplied by the cable modem to the wireless base station over the cable connecting the wireless base station to the cable modem. The cable connecting the wireless base station to the cable mode is also by the cable modem and the wireless base station to communicate with one another. The cable modem is positioned between the wireless base station and the cable modem termination system.

When the system is operating, the wireless base station provides services, e.g., broadband services, to user equipment devices, e.g., wireless devices such as laptops, smartphones, cellphones, tablets, cars, etc. which connect to the wireless base station. The user equipment device uplink data is sent to the core network (e.g., core network 150) of the service provider (e.g., service provider 1 in system 100) which operates both the wireless base station 1 102, the cable modem 104, the cable modem termination system 1 122 and the core network 150. The service provider provides both wireless and cable services. The user equipment device uplink data which is sent to the core network traverses the following path: user equipment device to wireless base station to cable modem to cable modem termination system to core network device. Downlink data sent via the core network to the user equipment device follows the reverse path: core network to cable modem termination system to cable modem to wireless base station to user equipment device.

Operation proceeds from step 1008 to optional step 1010. In optional step 1010. The wireless base station registers with a resource allocation management device, e.g., a spectrum access system (e.g., RAMD 1 126 of system 100). This optional step is typically implemented by wireless base stations such as for example CBSD base stations of CBRS systems wherein a Spectrum Access System allocates and manages spectrum, e.g., General Authorized Access spectrum, which a wireless base station is to utilize. Operation proceeds from optional step 1010 to optional step 1012.

In optional step 1012, the resource allocation management device grants spectrum to the wireless base station for use in communicating with user equipment devices. Operation proceeds from optional step 1012 to step 1014.

When optional steps 1010 and 1012 are not implemented, operation proceeds from step 1008 to step 1014.

In step 1014, the CMTS communicates to the cable modem CMTS buffer information, e.g., CMTS uplink buffer size information for the CMTS uplink buffer used for storing data communicated from the cable modem to the CMTS and CMTS downlink buffer size information for the CMTS downlink buffer used for storing data to be communicated to the cable modem. To the extent that the CMTS utilizes a common downlink buffer for multiple cable modems, the CMTS provides information corresponding to the size, amount or portion of the common buffer reserved for use for data to be transmitted to the cable modem (e.g., cable modem 1 104). To the extent that the CMTS utilizes a common uplink buffer for multiple cable modems, the CMTS provides information corresponding to the size, amount or portion of the common buffer reserved for use for data to be stored that received from the cable modem (e.g., cable modem 1 104). In some embodiments, the CMTS buffer information includes a first downlink buffer size value expressed as an amount of time (e.g., an amount of time it takes for the cable modem termination system downlink buffer for the cable modem to fill up to its capacity, e.g., so that all entries in the CMTS downlink buffer used for the cable modem are occupied). In some embodiments, the CMTS buffer information includes a first uplink buffer size value expressed as an amount of time (e.g., an amount of time it takes for the cable modem termination system uplink buffer for the cable modem to fill up to its capacity, e.g., so that all entries in the CMTS uplink buffer used for the cable modem are occupied). Operation proceeds from step 1014 to step 1016.

In step 1016, the cable modem receives the CMTS buffer information. The cable modem also stores the received CMTS buffer information in memory in the cable modem. Operation proceeds from step 1016 to step 1018.

In step 1018, the wireless base station, e.g., wireless base station 102 of system 100, communicates to the cable modem wireless base station buffer information, e.g., wireless base station downlink buffer size information for the wireless base station downlink buffer used for storing data communicated from the cable modem to the wireless base station and wireless base station uplink buffer size information for the wireless base station uplink buffer used for storing data to be communicated to the cable modem. To the extent that the wireless base station utilizes separate uplink buffers for different user equipment devices, the wireless base station provides information corresponding to the aggregate size of the uplink buffers reserved for use for storing data to be transmitted from the wireless base station to the cable modem (e.g., cable modem 1 104). To the extent that the wireless base station utilizes different downlink buffers for different user equipment devices, the wireless base station provides information corresponding to the aggregate size of the downlink buffers reserved for use for storing data that is received from the cable modem (e.g., cable modem 1 104). In some embodiments, the wireless base station buffer information includes a first downlink buffer size value expressed as an amount of time (e.g., an amount of time it takes for the wireless base station downlink buffer to fill up to its capacity, i.e., all entries in the wireless base station downlink become occupied). In some embodiments, the wireless base station buffer information includes a first uplink buffer size value expressed as an amount of time (e.g., an amount of time it takes for the wireless base station uplink buffer used for the cable modem to fill up to its capacity, i.e., all entries in the wireless base station uplink buffer become occupied). Operation proceeds from step 1018 to step 1020.

In step 1020, the cable modem receives the wireless base station buffer information. The cable modem stores the wireless base station buffer information in memory at the cable modem. Operation proceeds from step 1020 via connection node A 1022 to step 1024 shown on FIG. 10B.

In step 1024, the cable modem creates a downlink data buffer in which to store downlink data traffic that will be received from the CMTS by the cable modem for transmission to the wireless base station. Step 1024 in some embodiments includes one or more sub-steps 1026 and 1028.

In sub-step 1026, the cable modem creates the downlink data buffer using the CMTS buffer information (e.g., the CMTS downlink buffer size) and/or the wireless base station buffer information (e.g., the wireless base station downlink buffer size).

In sub-step 1028, the cable modem creates the downlink data buffer based on the wireless base station downlink buffer size. The wireless base station downlink buffer size information being included in the wireless base station buffer information.

Operation proceeds from step 1024 to step 1030. In step 1030, the cable modem creates an uplink data buffer in which to store uplink data traffic that will be received from the wireless base station by the cable modem for transmission to the cable modem termination system. Step 1030 in some embodiments includes one or more sub-steps 1032 and 1034.

In sub-step 1032, the cable modem creates the uplink data buffer using the CMTS buffer information (e.g., the CMTS uplink buffer size) and/or the wireless base station buffer information (e.g., the wireless base station uplink buffer size).

In sub-step 1034, the cable modem creates the uplink data buffer based on the wireless base station uplink buffer size. The wireless base station uplink buffer size information being included in the wireless base station buffer information.

The cable modem in some embodiments uses the wireless base station uplink buffer size to determine the cable modem uplink buffer size. The cable modem uplink buffer in some embodiments is created from memory of the cable modem and is created to have a size equal to or greater than the wireless base station uplink buffer size. This allows the wireless base station to flush its uplink buffer if it is full after a period of time when the cable modem has been in a power savings mode of operation and has not been accepting data. In various embodiments, the cable modem uplink buffer is also created to have a size that is smaller than the CMTS uplink buffer so that it can transmit all of its uplink data to the CMTS in a burst or at one time, i.e., flush the uplink buffer when the cable modem's uplink buffer is full.

The cable modem in some embodiments uses the CMTS downlink buffer size to determine the cable modem downlink buffer size. The cable modem downlink buffer in some embodiments is created from memory of the cable modem and is created to have a size equal to or greater than the CMTS downlink buffer size. This allows the CMTS to flush its downlink buffer if it is full after a period of time when the cable modem has been in a power savings mode of operation and has not been accepting data. In various embodiments, the cable modem downlink buffer is also created to have a size that is smaller than the wireless base station downlink buffer so that it can transmit all of its uplink data to the wireless base station in a burst or at one time, i.e., flush the downlink buffer when the cable modem's downlink buffer is full.

Operation proceeds from step 1030 to step 1036. In step 1036, the cable modem determines the amount of power consumed by the cable modem to transmit the data from its downlink buffer to the wireless base station when all entries of the downlink data buffer are fully occupied, i.e., the downlink data buffer is full. Operation proceeds from step 1036 to step 1038.

In step 1038, the cable modem determines the amount of power consumed by the cable modem to transmit the data from its uplink buffer to the wireless base station when all entries of the uplink data buffer are fully occupied, i.e., the uplink data buffer is full. Operation proceeds from step 1038 to step 1040.

In step 1040, the cable modem reports to the CMTS and/or to the CMTS power management device (e.g., CMTS power management device 152 of system 100) the determined amount of power consumed by the cable modem to transmit the data from its uplink buffer to the CMTS when all entries of the uplink buffer are full. In some embodiments, the CMTS power management device 152 functionality as it relates to CMTS 1 122 is incorporated into the CMTS 1 122 in which case the power consumption information is reported to the CMTS 1 122 by the cable modem 1 104. Operation proceeds from step 1040 to step 1042.

In step 1042, the cable modem reports to the CMTS and/or to the CMTS power management device (e.g., CMTS power management device 152 of system 100) the determined amount of power consumed by the cable modem to transmit the data from its downlink buffer to the wireless base station when all entries of the downlink buffer are full. In some embodiments, the CMTS power management device 152 functionality as it relates to CMTS 1 122 is incorporated into the CMTS 1 122 in which case the power consumption information is reported to the CMTS 1 122 by the cable modem 1 104. Operation proceeds from step 1042 to step 1046 shown on FIG. 10C via connection node 1044.

In step 1046, user equipment devices connect to the wireless base station and begin sending uplink data and requests for downlink data to the wireless base station. Operation proceeds from step 1046 to step 1048.

In step 1048, the wireless base station receives from the user equipment devices the uplink data and downlink data requests. Operation proceeds from step 1048 to step 1050.

In step 1050, the wireless base station stores the uplink data and downlink data requests received from the user equipment devices in the wireless base station uplink data buffer. Operation proceeds from step 1050 to step 1052.

In step 1052, when the wireless base station determines the wireless base station uplink buffer is full, the wireless base station transmits the full contents of the wireless base statin uplink buffer to the cable modem. Operation proceeds from step 1052 to step 1054.

In step 1054, the cable modem while operating in a first mode of operation receives the uplink data and downlink data requests from the wireless base station. The first mode of operation is a non-power savings mode of operation in which the cable modem has its transmitters and receivers in a powered up and active state for communicating with the wireless base station and/or the CMTS. Operation proceeds from step 1054 to step 1056.

In step 1056, the cable modem while operating in the first mode of operation receives stores the received uplink data and downlink data requests from the wireless base station in the cable modem uplink buffer. Operation proceeds from step 1056 to step 1058. In step 1058, the cable modem while operating in the first mode of operation receives downlink data from the CMTS for transmission to the wireless base station. Operation proceeds from step 1058 to step 1060.

In step 1060, the cable modem while operating in the first mode of operation stores the received downlink data from the CMTS in the cable modem downlink buffer. Operation proceeds from step 1060 via connection node C 1062 to step 1064 shown on FIG. 10D.

In step 1064, while operating in the first mode of operation, the cable modem monitors the amount of the entries in the cable modem uplink buffer which have been filled and the amount of entries in the cable modem downlink buffer that have been filled. Operation proceeds from step 1064 to step 1066.

In step 1066, upon detecting by the cable modem that at least one of the following has occurred: (i) the cable modem uplink buffer has met a first threshold fill amount, or (ii) the cable modem downlink buffer has met a second threshold fill amount, the cable modem transmits all data in its uplink buffer to the CMTS and all data in its downlink buffer to the wireless base station. Operation proceeds from step 1066 to step 1068.

In step 1068, upon the cable modem transmitting all data in the downlink buffer to the wireless base station, the cable modem transmits a message to the CMTS indicating that the CMTS is not to send data to the cable modem. Operation proceeds from step 1068 to step 1070.

In step 1070, upon the cable modem transmitting all data in the uplink buffer to the CMTS, the cable modem transmits a message to the wireless base station indicating that the wireless base station is not to send data to the cable modem. Operation proceeds from step 1070 to step 1072.

In step 1072, the cable modem switches from the first mode of operation to a second mode of operation. The second mode of operation is a power saving mode of operation. Operation proceeds from step 1072 to step 1074.

In step 1074, the cable modem while operating in the power savings mode of operation sets a power savings timer to a first timer value. The first timer value being based on at least one of: (i) the CMTS buffer information (e.g., the CMTS buffer downlink size) or (ii) the wireless base station buffer information (e.g., wireless base station buffer uplink buffer size). In some embodiments step 1074 includes sub-step 1076. In sub-step 1076, the cable modem sets the power savings timer to a first timer value. The first timer value being an amount of time equal to or less than the lesser of: (i) the CMTS downlink buffer size expressed as an amount of time required to fill all entries of the CMTS downlink buffer or portion of the CMTS downlink buffer reserved for use for storing data to be sent to the cable modem and (ii) the wireless base station uplink buffer size expressed as an amount of time required to fill all entries of the wireless base station uplink buffer. In various embodiments, the cable modem determines a first timer value which is less than the lesser of the CMTS downlink buffer size as expressed as an amount of time to fill the CMTS downlink buffer and the wireless base station uplink buffer size expressed as an amount of time to fill the wireless base station uplink buffer. In this way, neither the CMTS downlink buffer or the wireless base station uplink buffer will overflow. Operation proceeds from step 1074 to step 1078.

In step 1078, the cable modem while operating in the power savings mode of operation deactivates and/or turns off power to one or more of its transmitters and/or its receivers to reduce the cable modem's power consumption. In many embodiments, the cable modem turns off power to all of its transmitters and receivers to minimize power consumption. Operation proceeds from step 1078 to step 1082 shown on FIG. 10E via connection node D 1080.

In step 1082, upon passage of an amount of time equal to the first timer value, the power savings timer causes the cable modem to switch from the power savings mode of operation to the non-power savings mode of operation. In some embodiments, step 1082 includes sub-step 1084. In sub-step 1084, when the power savings timer expires, the power savings timer causes the cable modem or a processor in the cable modem to execute one or more instructions causing the cable modem to switch from the power saving mode of operation to the non-power savings mode of operation. Operation proceeds from step 1082 to step 1086.

In step 1086, after switching from the power saving mode of operation to the non-power savings mode of operation, the cable modem re-activates and/or turns on power to the receivers and/or transmitters it turned off and/or de-activated when the cable modem previously entered power savings mode of operation (e.g., all of its receivers and transmitters are re-activated and/or have their power turned on). Operation proceeds from step 1086 to step 1088.

In step 1088, the cable modem notifies the wireless base station and the CMTS to begin sending data to the cable modem again. In some embodiments step 1088 includes one or more sub-steps 1090 and 1092. In sub-step 1090, the cable modem transmits a message to the wireless base station indicating that the wireless base station is to send data to the cable modem as the cable modem is available to receive data from the wireless base station. In sub-step 1092, the cable modem transmits a message to the CMTS indicating that the CMTS is to send data to the cable modem as the cable modem is available to receive data from the CMTS. Operation proceeds from step 1088 via connection node E 1094 to step 1052 shown on FIG. 10C wherein the method continues on with the wireless base station determining its uplink buffer is once again full, the wireless base station transmits the full contents of the wireless base station uplink buffer to the cable modem.

While the process of management and reduction of power with respect to a single cable modem has been described the process is implemented by numerous cable modems under the control of the numerous CMTS. For example, cable modems 1 104, . . . , cable modem Y 114 of system 100 may implement the method 1000.

Various implementations and optional features of the invention will now be discussed. In various embodiments, the receiving and storage steps of the cable modem of data from the wireless base station and the CMTS are performed independently and may be done in parallel, concurrently or simultaneously. Similarly, the transmission of data from the cable modem to the wireless base station and CMTS may also be performed in parallel, concurrently or simultaneously.

In some embodiments, the wireless base station is part of a wireless network operated by a first service provider. In some embodiments, the cable modem is part of a cable network operated by the first service provider. In some embodiments, the cable modem termination system is part of the cable network operated by the first service provider. In some embodiments, the wireless base station is a Citizens Broadband Service Device (CBSD) and the wireless network is a Citizens Broadband Radio Service (CBRS) network. In most embodiments, the cable modem is powered by the cable modem termination system. In some embodiments, the wireless base station is powered by the cable modem termination system via the cable modem.

In various embodiments, the power is provided by the cable modem termination system to the cable modem using power over Ethernet; and wherein power is provided by the cable modem to the wireless base station using power over Ethernet.

In at least some embodiments, the cable modem termination system buffer information includes a first downlink buffer size value expressed as an amount of time (e.g., an amount of time it takes for the cable modem termination system downlink buffer for the cable modem to fill up to its capacity); and the wireless base station buffer information includes a first uplink buffer size value expressed as an amount of time (e.g., an amount of time it takes for the wireless base station uplink buffer to fill up to its capacity).

In some embodiments, the first threshold value is an amount wherein 100% of all buffer entries in the cable modem uplink buffer are occupied (i.e., the buffer is full). In some embodiments, the first threshold value is an amount less than 100% of all buffer entries in the cable modem uplink buffer being occupied. In some embodiments, the first threshold value is an amount wherein 95% of all buffer entries in the cable modem uplink buffer are occupied (i.e., 95% of the buffer's capacity has been utilized—this case allows for some spare capacity should it be necessary).

In some embodiments, the second threshold value is an amount wherein 100% of all buffer entries in the cable modem downlink buffer are occupied (i.e., the buffer is full). In some embodiments, the second threshold value is an amount less than 100% of all buffer entries in the cable modem uplink buffer being occupied (e.g., the buffer is full and receipt of additional data will cause it to overflow). In some embodiments, the second threshold value is an amount wherein 95% of all buffer entries in the cable modem uplink buffer are occupied (i.e., 95% of the buffer's capacity has been utilized—this case allows for some spare capacity should it be necessary).

In at least some embodiments, the first and second threshold values are determined by the cable modem through statistical analysis wherein the cable modem determines the first and second threshold value to optimize the amount of time that the cable modem can stay in power savings mode over the course of a time period, e.g., an hour, day or week.

Various exemplary numbered embodiments illustrating different features of the present invention will now be discussed.

List of Exemplary Numbered Method Embodiments:

Method Embodiment 1. A communications method comprising: receiving, by a cable modem positioned between a cable modem termination system and a wireless base station, cable modem termination system buffer information; receiving, by the cable modem, wireless base station buffer information; switching, by the cable modem, from a first mode of operation to a second mode of operation after performing one or both of: (i) transmitting uplink data to the cable modem termination system, and (ii) transmitting downlink data to the wireless base station, said second mode of operation being a power savings modem of operation; remaining in said power savings mode of operation for a first time period, said first time period being based on at least one of said cable modem termination system buffer information or said wireless base station buffer information.

Method Embodiment 1A. The communications method of Method Embodiment 1, wherein the wireless base station is part of a wireless network operated by a first service provider; wherein the cable modem is part of a cable network operated by the first service provider; and wherein the cable modem termination system is part of the cable network operated by the first service provider.

Method Embodiment 1AA. The communications method of Method Embodiment 1, wherein the wireless base station is a Citizens Broadband Service Device (CBSD) and the wireless network is a Citizens Broadband Radio Service (CBRS) network.

Method Embodiment 1B. The communications method of Method Embodiment 1, wherein the cable modem is powered by the cable modem termination system.

Method Embodiment 1BB. The communications method of Method Embodiment 1B, wherein the wireless base station is powered by the cable modem termination system via the cable modem.

Method Embodiment 1C. The communications method of Method Embodiment 1, further comprising: receiving power by the cable modem from the cable modem termination system over a first cable connecting the cable modem termination system and the cable modem, said first cable also being used for communicating messages between the cable modem termination system and the cable modem.

Method Embodiment 1CC. The communications method of Method Embodiment 1C, further comprising: providing power by the cable modem to the wireless base station over a second cable connecting the cable modem to the wireless base station, said second cable also being used for communicating messages between the cable modem and the wireless base station.

Method Embodiment 1E. The communications method of Method Embodiment 1BB or 1CC, wherein power is provided by the cable modem termination system to the cable modem using power over Ethernet; and wherein power is provided by the cable modem to the wireless base station using power over Ethernet.

Method Embodiment 2. The communications method of Method Embodiment 1, wherein the cable modem termination system buffer information includes a first downlink buffer size value expressed as an amount of time (e.g., an amount of time it takes for the cable modem termination system downlink buffer for the cable modem to fill up to its capacity); wherein the wireless base station buffer information includes a first uplink buffer size value expressed as an amount of time (e.g., an amount of time it takes for the wireless base station uplink buffer to fill up to its capacity).

Method Embodiment 3. The communications method of Method Embodiment 1 further comprising: receiving, by the cable modem, while said cable modem is in said first mode of operation downlink data from the cable modem termination system; storing the received downlink data at the cable modem in a cable modem downlink buffer; receiving, by the cable modem, while said cable mode is in said first mode of operation uplink data from the wireless base station; storing the received uplink data at the cable modem in a cable modem uplink buffer; and waiting until at least one of the following occurs: (i) the amount of data in the cable modem uplink buffer reaches a first threshold value, or (ii) the amount of data in the cable modem downlink buffer reaches a second threshold value, before transmitting either the stored downlink data or the stored uplink data.

Method Embodiment 3A. The communications method of Method Embodiment 3, wherein the first threshold value is an amount wherein 100% of all buffer entries in the cable modem uplink buffer are occupied (i.e., the buffer is full).

Method Embodiment 3AA. The communications method of Method Embodiment 3, wherein the first threshold value is an amount less than 100% of all buffer entries in the cable modem uplink buffer being occupied.

Method Embodiment 3AAA. The communications method of Method Embodiment 3, wherein the first threshold value is an amount wherein 95% of all buffer entries in the cable modem uplink buffer are occupied (i.e., 95% of the buffer's capacity has been utilized—this case allows for some spare capacity should it be necessary).

Method Embodiment 3B. The communications method of Method Embodiment 3A, wherein the second threshold value is an amount wherein 100% of all buffer entries in the cable modem downlink buffer are occupied (i.e., the buffer is full).

Method Embodiment 3BB. The communications method of Method Embodiment 3AA, wherein the second threshold value is an amount less than 100% of all buffer entries in the cable modem uplink buffer being occupied (e.g., the buffer is full and receipt of additional data will cause it to overflow).

Method Embodiment 3BBB. The communications method of Method Embodiment 3, wherein the second threshold value is an amount wherein 95% of all buffer entries in the cable modem uplink buffer are occupied (i.e., 95% of the buffer's capacity has been utilized—this case allows for some spare capacity should it be necessary).

Method Embodiment 5. The communications method of Method Embodiment 1, further comprising: upon switching to said power savings mode of operation, turning off power by said cable modem to one or more cable modem transmitters included in said cable modem.

Method Embodiment 6. The communications method of Method Embodiment 5, further comprising: upon switching to said power savings mode of operation, turning off power by said cable modem to one or more cable modem receivers included in said cable modem.

Method Embodiment 6A. The communications method of Method Embodiment 6, wherein the switching, by the cable modem, from the first mode of operation to the second mode of operation occurs after performing both of: (i) transmitting uplink data to the cable modem termination system, and (ii) transmitting downlink data to the wireless base station, said second mode of operation being a power savings modem of operation.

Method Embodiment 6AA. The communications method of Method Embodiment 6AA, wherein said turning off power by said cable modem to one or more cable modem transmitters included in said cable modem includes turning off power to all transmitters included in said cable modem; wherein said turning off power by said cable modem to one or more cable modem receivers included in said cable modem includes turning off power to all receivers included in said cable modem.

Method Embodiment 7. The communications method of Method Embodiment 6, further comprising: prior to turning off said one or more cable modem transmitters, (i) transmitting by the cable modem a first message to the wireless base station indicating that data is not to be sent by the wireless base station to the cable modem; and (ii) transmitting a second message to the cable modem termination system indicating that data is not to be sent by the cable modem termination system to the cable modem.

Method Embodiment 8. The communications method of Method Embodiment 7, further comprising: after the cable modem has remained in the power savings mode of operation for the first time period, switching by the cable modem from the power savings mode of operation back to the first mode of operation.

Method Embodiment 8A. The communications method of Method Embodiment 8, further comprising: setting, by the cable modem, a power saving timer to expire after a first time value equal to said first time period prior to or upon entering said power saving mode of operation.

Method Embodiment 8B. The communications method of Method Embodiment 8A, wherein the expiration of said power saving timer causes the cable modem to switch from said power saving mode of operation to the first mode of operation.

Method Embodiment 9. The communications method of Method Embodiment 8, further comprising: upon switching from power savings mode of operation to said first mode of operation, turning power on to: (i) the one or more cable modem transmitters for which power was turned off, and (ii) the one or more cable mode receivers for which the power was turned off.

Method Embodiment 10. The communications method of Method Embodiment 9, further comprising: after turning on power to the one or more transmitters and one or more receivers, transmitting a message to the cable modem termination system indicating the cable modem termination system is to send data to the cable modem; after turning on power to the one or more transmitters and one or more receivers, transmitting a message to the wireless base station indicating the wireless base station is to send data to the cable modem.

Method Embodiment 11. The communications method of Method Embodiment 1, further comprising: determining, by the cable modem, the first time period based on at least one of the wireless base station buffer information or the cable modem termination system buffer information.

Method Embodiment 11A. The communications method of Method Embodiment 12, wherein said determining, by the cable modem, the first time period based on at least one of the wireless base station buffer information or the cable modem termination system buffer information includes: determining, by the cable modem, the first time period to be less than the smaller of: (i) an amount of time for a wireless base station uplink buffer used for storing uplink data to be transmitted to the cable modem to fill up or reach its capacity or (ii) an amount of time for the cable modem termination system downlink buffer used for storing downlink data to be transmitted to the cable modem to fill up or reach its capacity.

List of Exemplary Numbered Apparatus Embodiments:

Apparatus Embodiment 1. A cable modem comprising: a memory, said memory including an uplink buffer and a downlink buffer; and a processor that controls the cable modem to perform the following operations: receiving cable modem termination system buffer information, said cable modem being positioned between a cable modem termination system and a wireless base station; receiving wireless base station buffer information; switching from a first mode of operation to a second mode of operation after performing one or both of: (i) transmitting uplink data to the cable modem termination system, and (ii) transmitting downlink data to the wireless base station, said second mode of operation being a power savings modem of operation; remaining in said power savings mode of operation for a first time period, said first time period being based on at least one of said cable modem termination system buffer information or said wireless base station buffer information.

Apparatus Embodiment 1A. The cable modem of Apparatus Embodiment 1, wherein the wireless base station is part of a wireless network operated by a first service provider; wherein the cable modem is part of a cable network operated by the first service provider; and wherein the cable modem termination system is part of the cable network operated by the first service provider.

Apparatus Embodiment 1AA. The cable modem of Apparatus Embodiment 1, wherein the wireless base station is a Citizens Broadband Service Device (CBSD) and the wireless network is a Citizens Broadband Radio Service (CBRS) network.

Apparatus Embodiment 1B. The cable modem of Apparatus Embodiment 1, wherein the cable modem is powered by the cable modem termination system.

Apparatus Embodiment 1BB. The cable mode of Apparatus Embodiment 1B, wherein the wireless base station is powered by the cable modem termination system via the cable modem.

Apparatus Embodiment 1C. The cable modem of Apparatus Embodiment 1, wherein the processor further controls the cable modem to perform the following additional operation: receiving power by the cable modem from the cable modem termination system over a first cable connecting the cable modem termination system and the cable modem, said first cable also being used for communicating messages between the cable modem termination system and the cable modem.

Apparatus Embodiment 1CC. The cable modem of Apparatus Embodiment 1C, wherein the processor further controls the cable modem to perform the following additional operation: providing power by the cable modem to the wireless base station over a second cable connecting the cable modem to the wireless base station, said second cable also being used for communicating messages between the cable modem and the wireless base station.

Apparatus Embodiment 1E. The cable modem of Apparatus Embodiment 1BB or 1CC, wherein power is provided by the cable modem termination system to the cable modem using power over Ethernet; and wherein power is provided by the cable modem to the wireless base station using power over Ethernet.

Apparatus Embodiment 2. The cable modem of Apparatus Embodiment 1, wherein the cable modem termination system buffer information includes a first downlink buffer size value expressed as an amount of time (e.g., an amount of time it takes for the cable modem termination system downlink buffer for the cable modem to fill up to its capacity); wherein the wireless base station buffer information includes a first uplink buffer size value expressed as an amount of time (e.g., an amount of time it takes for the wireless base station uplink buffer to fill up to its capacity).

Apparatus Embodiment 3. The cable modem of Apparatus Embodiment 1, wherein the processor further controls the cable modem to perform the additional operations of: receiving, by the cable modem, while said cable modem is in said first mode of operation downlink data from the cable modem termination system; storing the received downlink data at the cable modem in a cable modem downlink buffer; receiving, by the cable modem, while said cable mode is in said first mode of operation uplink data from the wireless base station; storing the received uplink data at the cable modem in a cable modem uplink buffer; and waiting until at least one of the following occurs: (i) the amount of data in the cable modem uplink buffer reaches a first threshold value, or (ii) the amount of data in the cable modem downlink buffer reaches a second threshold value, before transmitting either the stored downlink data or the stored uplink data.

Apparatus Embodiment 3A. The cable modem of Apparatus Embodiment 3, wherein the first threshold value is an amount wherein 100% of all buffer entries in the cable modem uplink buffer are occupied (i.e., the buffer is full).

Apparatus Embodiment 3AA. The cable modem of Apparatus Embodiment 3, wherein the first threshold value is an amount less than 100% of all buffer entries in the cable modem uplink buffer being occupied.

Apparatus Embodiment 3AAA. The cable modem of Apparatus Embodiment 3, wherein the first threshold value is an amount wherein 95% of all buffer entries in the cable modem uplink buffer are occupied (i.e., 95% of the buffer's capacity has been utilized—this case allows for some spare capacity should it be necessary).

Apparatus Embodiment 3B. The cable modem of Apparatus Embodiment 3A, wherein the second threshold value is an amount wherein 100% of all buffer entries in the cable modem downlink buffer are occupied (i.e., the buffer is full).

Apparatus Embodiment 3BB. The cable modem of Apparatus Embodiment 3AA, wherein the second threshold value is an amount less than 100% of all buffer entries in the cable modem uplink buffer being occupied (e.g., the buffer is full and receipt of additional data will cause it to overflow).

Apparatus Embodiment 3BBB. The cable modem of Apparatus Embodiment 3, wherein the second threshold value is an amount wherein 95% of all buffer entries in the cable modem uplink buffer are occupied (i.e., 95% of the buffer's capacity has been utilized—this case allows for some spare capacity should it be necessary).

Apparatus Embodiment 5. The cable modem of Apparatus Embodiment 1, wherein the processor further controls the cable modem to perform the following additional operation upon switching to said power savings mode of operation: turning off power by said cable modem to one or more cable modem transmitters included in said cable modem.

Apparatus Embodiment 6. The cable modem of Apparatus Embodiment 5, wherein the processor further controls the cable modem to perform the following additional operation upon switching to said power savings mode of operation: turning off power by said cable modem to one or more cable modem receivers included in said cable modem.

Apparatus Embodiment 6A. The cable modem of Apparatus Embodiment 6, wherein the switching, by the cable modem, from the first mode of operation to the second mode of operation occurs after performing both of: (i) transmitting uplink data to the cable modem termination system, and (ii) transmitting downlink data to the wireless base station, said second mode of operation being a power savings modem of operation.

Apparatus Embodiment 6AA. The cable modem of Apparatus Embodiment 6AA, wherein said turning off power by said cable modem to one or more cable modem transmitters included in said cable modem includes turning off power to all transmitters included in said cable modem; wherein said turning off power by said cable modem to one or more cable modem receivers included in said cable modem includes turning off power to all receivers included in said cable modem.

Apparatus Embodiment 7. The cable modem of Apparatus Embodiment 6, wherein prior to turning off said one or more cable modem transmitters, the processor further controls the cable modem to perform the following additional operations: (i) transmitting by the cable modem a first message to the wireless base station indicating that data is not to be sent by the wireless base station to the cable modem; and (ii) transmitting a second message to the cable modem termination system indicating that data is not to be sent by the cable modem termination system to the cable modem.

Apparatus Embodiment 8. The cable modem of Apparatus Embodiment 7, wherein after the cable modem has remained in the power savings mode of operation for the first time period, the processor further controls the cable modem to perform the following additional operation: switching by the cable modem from the power savings mode of operation back to the first mode of operation.

Apparatus Embodiment 8A. The cable modem of Apparatus Embodiment 8, wherein the processor further controls the cable modem to perform the following additional operation: setting, by the cable modem, a power saving timer to expire after a first time value equal to said first time period prior to or upon entering said power saving mode of operation.

Apparatus Embodiment 8B. The cable modem of Apparatus Embodiment 8A, wherein the expiration of said power saving timer causes the cable modem to switch from said power saving mode of operation to the first mode of operation.

Apparatus Embodiment 9. The cable modem of Apparatus Embodiment 8, wherein the processor further controls the cable modem upon switching from power savings mode of operation to said first mode of operation to perform the following additional operation: turning power on to: (i) the one or more cable modem transmitters for which power was turned off, and (ii) the one or more cable mode receivers for which the power was turned off.

Apparatus Embodiment 10. The cable modem of Apparatus Embodiment 9, wherein after turning on power to the one or more transmitters and one or more receivers, the processor further controls the cable modem to perform the following additional operations: transmitting a message to the cable modem termination system indicating the cable modem termination system is to send data to the cable modem; and transmitting a message to the wireless base station indicating the wireless base station is to send data to the cable modem.

Apparatus Embodiment 11. The cable modem of Apparatus Embodiment 1, wherein the processor further control the cable modem to perform the following additional operation: determining, by the cable modem, the first time period based on at least one of the wireless base station buffer information or the cable modem termination system buffer information.

Apparatus Embodiment 11A. The cable modem of Apparatus Embodiment 12, wherein said determining, by the cable modem, the first time period based on at least one of the wireless base station buffer information or the cable modem termination system buffer information includes: determining, by the cable modem, the first time period to be less than the smaller of: (i) an amount of time for a wireless base station uplink buffer used for storing uplink data to be transmitted to the cable modem to fill up or reach its capacity or (ii) an amount of time for the cable modem termination system downlink buffer used for storing downlink data to be transmitted to the cable modem to fill up or reach its capacity.

List of Exemplary Numbered Non-Transitory Computer Readable Medium Embodiments:

Non-transitory Computer Readable Medium Embodiment 1. A non-transitory computer readable medium including a first set of computer executable instructions which when executed by a processor of a cable modem cause the cable modem to perform the steps of: receiving cable modem termination system buffer information, said cable modem being positioned between a cable modem termination system and a wireless base station; receiving wireless base station buffer information; switching from a first mode of operation to a second mode of operation after performing one or both of: (i) transmitting uplink data to the cable modem termination system, and (ii) transmitting downlink data to the wireless base station, said second mode of operation being a power savings modem of operation; remaining in said power savings mode of operation for a first time period, said first time period being based on at least one of said cable termination system buffer information or said wireless base station buffer information.

Non-transitory Computer Readable Medium Embodiment 2. The Non-transitory Computer Readable Medium of Non-transitory Computer Readable Medium Embodiment 1, wherein the cable modem is powered by the cable modem termination system.

Non-transitory Computer Readable Medium Embodiment 3. The Non-transitory Computer Readable Medium of Non-transitory Computer Readable Medium Embodiment 2, wherein the wireless base station is powered by the cable modem termination system via the cable modem.

The techniques of various embodiments may be implemented using software, hardware and/or a combination of software and hardware. Various embodiments are directed to apparatus, e.g., cable modems, cable modem termination systems, cable modem termination system power management devices, wireless base stations, wireless devices, mobile terminals, sensors, vehicles, user equipment, terminal, gNBs, CBSDs, CBRS tower base stations, smart devices, vehicles, user equipment devices, user devices, computers, smartphones, Spectrum Access Systems, Resource Allocation Management Devices, subscriber devices, servers, nodes and/or elements. Various embodiments are also directed to methods, e.g., method of controlling and/or operating cable modems, cable modem termination systems, cable modem termination system power management devices, wireless base stations, wireless devices, mobile terminals, sensors, vehicles, user equipment, terminal, gNBs, CBSDs, CBRS tower base stations, smart devices, vehicles, user equipment devices, user devices, computers, smartphones, Spectrum Access Systems, Resource Allocation Management Devices, subscriber devices, servers, nodes and/or elements. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements or steps are implemented using hardware circuitry.

In various embodiments devices, e.g., cable modems, cable modem termination systems, cable modem termination system power management devices, wireless base stations, wireless devices, mobile terminals, sensors, vehicles, user equipment, terminal, gNBs, CBSDs, CBRS tower base stations, smart devices, vehicles, user equipment devices, user devices, computers, smartphones, Spectrum Access Systems, Resource Allocation Management Devices, subscriber devices, servers, nodes and/or elements described herein are implemented using one or more components to perform the steps corresponding to one or more methods, for example, generating or creating buffers, implementing timers, connections, message reception, message transmission, powering on and off receivers, transmitters, and or transceivers, buffering data, flushing data from buffers, determining buffer sizes and amount of time for a buffer to fill to its capacity, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more devices, servers, nodes and/or elements. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., cable modems, cable modem termination systems, cable modem termination system power management devices, wireless base stations, wireless devices, mobile terminals, sensors, vehicles, user equipment, terminal, gNBs, CBSDs, CBRS tower base stations, smart devices, vehicles, user equipment devices, user devices, computers, smartphones, Spectrum Access Systems, Resource Allocation Management Devices, subscriber devices, servers, nodes and/or elements are configured to perform the steps of the methods described as being performed by the cable modems, cable modem termination systems, cable modem termination system power management devices, wireless base stations, wireless devices, mobile terminals, sensors, vehicles, user equipment, terminal, gNBs, CBSDs, CBRS tower base stations, smart devices, vehicles, user equipment devices, user devices, computers, smartphones, Spectrum Access Systems, Resource Allocation Management Devices, subscriber devices, servers, nodes and/or elements. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., cable modems, cable modem termination systems, cable modem termination system power management devices, wireless base stations, wireless devices, mobile terminals, sensors, vehicles, user equipment, terminal, gNBs, CBSDs, CBRS tower base stations, smart devices, vehicles, user equipment devices, user devices, computers, smartphones, Spectrum Access Systems, Resource Allocation Management Devices, subscriber devices, servers, nodes and/or elements, with a processor which includes a component corresponding to each of the steps of the various described methods performed by the device in which the processor is included. In some but not all embodiments a device, e.g., cable modems, cable modem termination systems, cable modem termination system power management devices, wireless base stations, wireless devices, mobile terminals, sensors, vehicles, user equipment, terminal, gNBs, CBSDs, CBRS tower base stations, smart devices, vehicles, user equipment devices, user devices, computers, smartphones, Spectrum Access Systems, Resource Allocation Management Devices, subscriber devices, servers, nodes and/or elements, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above. Depending on the embodiment, the computer program product can, and sometimes does, include different code for each step to be performed. Thus, the computer program product may, and sometimes does, include code for each individual step of a method, e.g., a method of controlling a device, e.g., cable modems, cable modem termination systems, cable modem termination system power management devices, wireless base stations, wireless devices, mobile terminals, sensors, vehicles, user equipment, terminal, gNBs, CBSDs, CBRS tower base stations, smart devices, vehicles, user equipment devices, user devices, computers, smartphones, Spectrum Access Systems, Resource Allocation Management Devices, subscriber devices, servers, nodes and/or elements, Session Management Function nodes/devices, subscriber devices, servers, nodes and/or elements. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a cable modems, cable modem termination systems, cable modem termination system power management devices, wireless base stations, wireless devices, mobile terminals, sensors, vehicles, user equipment, terminal, gNBs, CBSDs, CBRS tower base stations, smart devices, vehicles, user equipment devices, user devices, computers, smartphones, Spectrum Access Systems, Resource Allocation Management Devices, subscriber devices, servers, nodes and/or elements or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method comprising:
receiving, by a cable modem positioned between a cable modem termination system and a wireless base station, cable modem termination system buffer information;
receiving, by the cable modem, wireless base station buffer information;
switching, by the cable modem, from a first mode of operation to a second mode of operation after performing one or both of: (i) transmitting uplink data to the cable modem termination system, and (ii) transmitting downlink data to the wireless base station, said second mode of operation being a power savings mode of operation; and
remaining in said power savings mode of operation for a first time period, said first time period being based on at least one of said cable modem termination system buffer information or said wireless base station buffer information.

2. The communications method of claim 1,
wherein the cable modem termination system buffer information includes a first downlink buffer size value expressed as an amount of time; and
wherein the wireless base station buffer information includes a first uplink buffer size value expressed as an amount of time.

3. The communications method of claim 1 further comprising:
receiving, by the cable modem, while said cable modem is in said first mode of operation downlink data from the cable modem termination system;
storing the received downlink data at the cable modem in a cable modem downlink buffer;
receiving, by the cable modem, while said cable modem is in said first mode of operation uplink data from the wireless base station;
storing the received uplink data at the cable modem in a cable modem uplink buffer; and
waiting until at least one of the following occurs: (i) the amount of data in the cable modem uplink buffer reaches a first threshold value, or (ii) the amount of data in the cable modem downlink buffer reaches a second threshold value, before transmitting either the stored downlink data or the stored uplink data.

4. The communications method of claim 1, further comprising:
upon switching to said power savings mode of operation, turning off power by said cable modem to one or more cable modem transmitters included in said cable modem.

5. The communications method of claim 4, further comprising:
upon switching to said power savings mode of operation, turning off power by said cable modem to one or more cable modem receivers included in said cable modem.

6. The communications method of claim 5, further comprising:
prior to turning off said one or more cable modem transmitters, (i) transmitting by the cable modem a first message to the wireless base station indicating that data is not to be sent by the wireless base station to the cable modem; and (ii) transmitting a second message to the cable modem termination system indicating that data is not to be sent by the cable modem termination system to the cable modem.

7. The communications method of claim 6, further comprising:
after the cable modem has remained in the power savings mode of operation for the first time period, switching by the cable modem from the power savings mode of operation back to the first mode of operation.

8. The communications method of claim 7, further comprising:
upon switching from the power savings mode of operation to said first mode of operation, turning power on to: (i) the one or more cable modem transmitters for which power was turned off, and (ii) the one or more cable modem receivers for which the power was turned off.

9. The communications method of claim 8, further comprising:
after turning on power to the one or more transmitters and one or more receivers, transmitting a message to the cable modem termination system indicating the cable modem termination system is to send data to the cable modem; and after turning on power to the one or more transmitters and one or more receivers, transmitting a message to the wireless base station indicating the wireless base station is to send data to the cable modem.

10. The communications method of claim 1, wherein the cable modem is powered by the cable modem termination system.

11. The communications method of claim 10, wherein the wireless base station is powered by the cable modem termination system via the cable modem.

12. A cable modem comprising:
a memory, said memory including a cable modem uplink buffer and a cable modem downlink buffer; and
a processor that controls the cable modem to perform the following operations:
receiving cable modem termination system buffer information, said cable modem being positioned between a cable modem termination system and a wireless base station;
receiving wireless base station buffer information;
switching from a first mode of operation to a second mode of operation after performing one or both of: (i) transmitting uplink data to the cable modem termination system, and (ii) transmitting downlink data to the wireless base station, said second mode of operation being a power savings mode of operation; and
remaining in said power savings mode of operation for a first time period, said first time period being based on at least one of said cable modem termination system buffer information or said wireless base station buffer information.

13. The cable modem of claim 12,
wherein the cable modem termination system buffer information includes a first downlink buffer size value expressed as an amount of time; and
wherein the wireless base station buffer information includes a first uplink buffer size value expressed as an amount of time.

14. The cable modem of claim 12, wherein the processor further controls the cable modem to perform the additional operations of:
receiving, by the cable modem, while said cable modem is in said first mode of operation downlink data from the cable modem termination system;
storing the received downlink data at the cable modem in the cable modem downlink buffer;
receiving, by the cable modem, while said cable modem is in said first mode of operation uplink data from the wireless base station;
storing the received uplink data at the cable modem in the cable modem uplink buffer; and
waiting until at least one of the following occurs: (i) the amount of data in the cable modem uplink buffer reaches a first threshold value, or (ii) the amount of data in the cable modem downlink buffer reaches a second threshold value, before transmitting either the stored downlink data or the stored uplink data.

15. The cable modem of claim 12, wherein the processor further controls the cable modem to perform the following additional operation upon switching to said power savings mode of operation:
turning off power by said cable modem to one or more cable modem transmitters included in said cable modem.

16. The cable modem of claim 15, wherein the processor further controls the cable modem to perform the following additional operation upon switching to said power savings mode of operation:
turning off power by said cable modem to one or more cable modem receivers included in said cable modem.

17. The cable modem of claim 16, wherein prior to turning off said one or more cable modem transmitters, the processor further controls the cable modem to perform the following additional operations: (i) transmitting by the cable modem a first message to the wireless base station indicating that data is not to be sent by the wireless base station to the cable modem; and (ii) transmitting a second message to the cable modem termination system indicating that data is not to be sent by the cable modem termination system to the cable modem.

18. The cable modem of claim 17, wherein after the cable modem has remained in the power savings mode of operation for the first time period, the processor further controls the cable modem to perform the following additional operation:
switching by the cable modem from the power savings mode of operation back to the first mode of operation.

19. The cable modem of claim 18, wherein the processor further controls the cable modem upon switching from the power savings mode of operation to said first mode of operation to perform the following additional operation:
turning power on to: (i) the one or more cable modem transmitters for which power was turned off, and (ii) the one or more cable modem receivers for which the power was turned off.

20. A non-transitory computer readable medium including a first set of computer executable instructions which when executed by a processor of a cable modem cause the cable modem to perform the steps of:
receiving cable modem termination system buffer information, said cable modem being positioned between a cable modem termination system and a wireless base station;
receiving wireless base station buffer information;
switching from a first mode of operation to a second mode of operation after performing one or both of: (i) transmitting uplink data to the cable modem termination system, and (ii) transmitting downlink data to the wireless base station, said second mode of operation being a power savings mode of operation; and
remaining in said power savings mode of operation for a first time period, said first time period being based on at least one of said cable termination system buffer information or said wireless base station buffer information.

* * * * *